United States Patent
Hikichi

(10) Patent No.: US 10,523,359 B2
(45) Date of Patent: Dec. 31, 2019

(54) COMMUNICATION CONTROL DEVICE AND COMMUNICATION SYSTEM

(71) Applicant: FUJITSU LIMITED, Kawasaki-shi, Kanagawa (JP)

(72) Inventor: Kenji Hikichi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 90 days.

(21) Appl. No.: 15/413,901

(22) Filed: Jan. 24, 2017

(65) Prior Publication Data
US 2017/0244516 A1     Aug. 24, 2017

(30) Foreign Application Priority Data
Feb. 22, 2016 (JP) ................. 2016-031349

(51) Int. Cl.
*H04L 1/00* (2006.01)
*H04L 5/00* (2006.01)
*H04L 12/771* (2013.01)

(52) U.S. Cl.
CPC .......... *H04L 1/0009* (2013.01); *H04L 5/0098* (2013.01); *H04L 45/56* (2013.01)

(58) Field of Classification Search
CPC ..... H04L 1/0009; H04L 45/56; H04L 5/0098; H04L 45/42; H04L 45/64; H04L 45/74; H04L 47/18; H04L 45/28; H04L 45/04
See application file for complete search history.

(56) References Cited

U.S. PATENT DOCUMENTS

| | | | | |
|---|---|---|---|---|
| 6,549,513 B1* | 4/2003 | Chao | ....... | H04L 45/00 370/227 |
| 9,838,317 B1* | 12/2017 | Yadav | ....... | H04L 47/127 |
| 2005/0122908 A1* | 6/2005 | Soumiya | ....... | H04J 14/0227 370/241 |
| 2006/0256712 A1* | 11/2006 | Imajuku | ....... | H01J 14/0284 370/218 |
| 2008/0225699 A1* | 9/2008 | Lee | ....... | H04L 45/02 370/218 |
| 2013/0128725 A1* | 5/2013 | Maggiari | ....... | H04L 43/0811 370/225 |

(Continued)

FOREIGN PATENT DOCUMENTS

| | | |
|---|---|---|
| JP | 2008-54233 | 3/2008 |
| JP | 2012-169889 | 9/2012 |
| JP | 2015-508622 | 3/2015 |

*Primary Examiner* — Mohamed A Kamara
(74) *Attorney, Agent, or Firm* — Staas & Halsey LLP

(57) ABSTRACT

There is provided a communication control device for controlling a communication device on a communication network, the communication control device including: a memory; a processor coupled with the memory and configured to: divide a route for a communication with the communication device into a plurality of sections; determine a communication control device for a failure recovery in a section of the plurality of sections, the communication control device for the failure recovery restoring a failure in the section of the plurality of sections; specify a section of the plurality of sections where the failure occurs when the failure is detected on the route; transmit failure information to the communication control device for the failure recovery corresponding to the section specified; and set a detour to the failure in the section, based on the failure information.

11 Claims, 24 Drawing Sheets

(56) References Cited

U.S. PATENT DOCUMENTS

| | | |
|---|---|---|
| 2014/0029416 A1* | 1/2014 | Ceccarellli ............... H04L 45/22 370/225 |
| 2014/0177634 A1 | 6/2014 | Jiang et al. |
| 2015/0016242 A1* | 1/2015 | Ernstrom .............. H04L 45/122 370/218 |
| 2015/0023156 A1* | 1/2015 | Csaszar ................... H04L 45/22 370/228 |
| 2015/0103671 A1* | 4/2015 | Ernstrom ............ H04L 41/0659 370/238 |
| 2015/0143184 A1* | 5/2015 | Suzuki ................ H04L 41/0668 714/48 |
| 2015/0163091 A1* | 6/2015 | Thubert ............. H04L 41/0668 370/225 |
| 2016/0099865 A1* | 4/2016 | Klincewicz ............. H04L 45/28 370/218 |
| 2016/0226701 A1* | 8/2016 | Luo ........................ H04L 45/02 |
| 2017/0288947 A1* | 10/2017 | Kaniampady Sebastian ............... H04L 12/6418 |

* cited by examiner

FIG. 4

| COMMUNICATION DEVICE ID (23A) | MASTER ID (23B) |
|---|---|
| N1 | C1 |
| N2 | C1 |
| N3 | C2 |
| N4 | C3 |
| N5 | C3 |
| N6 | C4 |

FIG. 5

| ROUTE ID (24A) | MANAGE-MENT ID (24B) | START POINT ID/ END POINT ID (24C/D) | ROUTE (24E) |
|---|---|---|---|
| R1 | C1 | START POINT : SITE T1<br>END POINT: SITE T2 | SITE T1, N1, N3, N4, N6, SITE T2 |

FIG. 6

| SECTION ID (25A) | ROUTE ID (25B) | MANAGE-MENT ID (25C) | START POINT ID/END POINT ID (25D/E) | ROUTE (25F) |
|---|---|---|---|---|
| SG1 | R1 | C1 | START POINT: SITE T1<br>END POINT:LINK BETWEEN N3-N4 | SITE T1, N1, N3, LINK BETWEEN N3-N4 |
| SG2 | R1 | C4 | START POINT:N4<br>END POINT: SITE T2 | N4, N6, SITE T2 |

FIG. 8

| SECTION ID (25A) | ROUTE ID (25B) | MANAGEMENT ID (25C) | START POINT ID/ END POINT ID (25D/E) | ROUTE (25F) |
|---|---|---|---|---|
| SG1 | R1 | C1 | START POINT: SITE T1<br>END POINT:LINK BETWEEN N3-N4 | SITE T1, N1, N3, LINK BETWEEN N3-N4 |
| SG2 | R1 | C4 | START POINT:N4<br>END POINT:SITE T2 | N4, N6, SITE T2 |

| SECTION ID (25A) | ROUTE ID (25B) | MANAGEMENT ID (25C) | START POINT ID/ END POINT ID (25D/E) | ROUTE (25F) |
|---|---|---|---|---|
| SG1 | R1 | C1 | START POINT: SITE T1<br>END POINT:LINK BETWEEN N3-N4 | SITE T1, N1, N3, LINK BETWEEN N3-N4 |
| SG2 | R1 | C4 | START POINT:N4<br>END POINT:SITE T2 | N4, N5, N6, SITE T2 |

| ROUTE ID | MANAGE-MENT ID | START POINT ID/ END POINT ID | ROUTE |
|---|---|---|---|
| R1 | C1 | START POINT: SITE T1 END POINT: SITE T2 | SITE T1, N1, N3, N4, N6, SITE T2 |

| ROUTE ID | MANAGE-MENT ID | START POINT ID/ END POINT ID | ROUTE |
|---|---|---|---|
| R1 | C1 | START POINT: SITE T1 END POINT: SITE T2 | SITE T1, N1, N3, N4, N5, N6, SITE T2 |

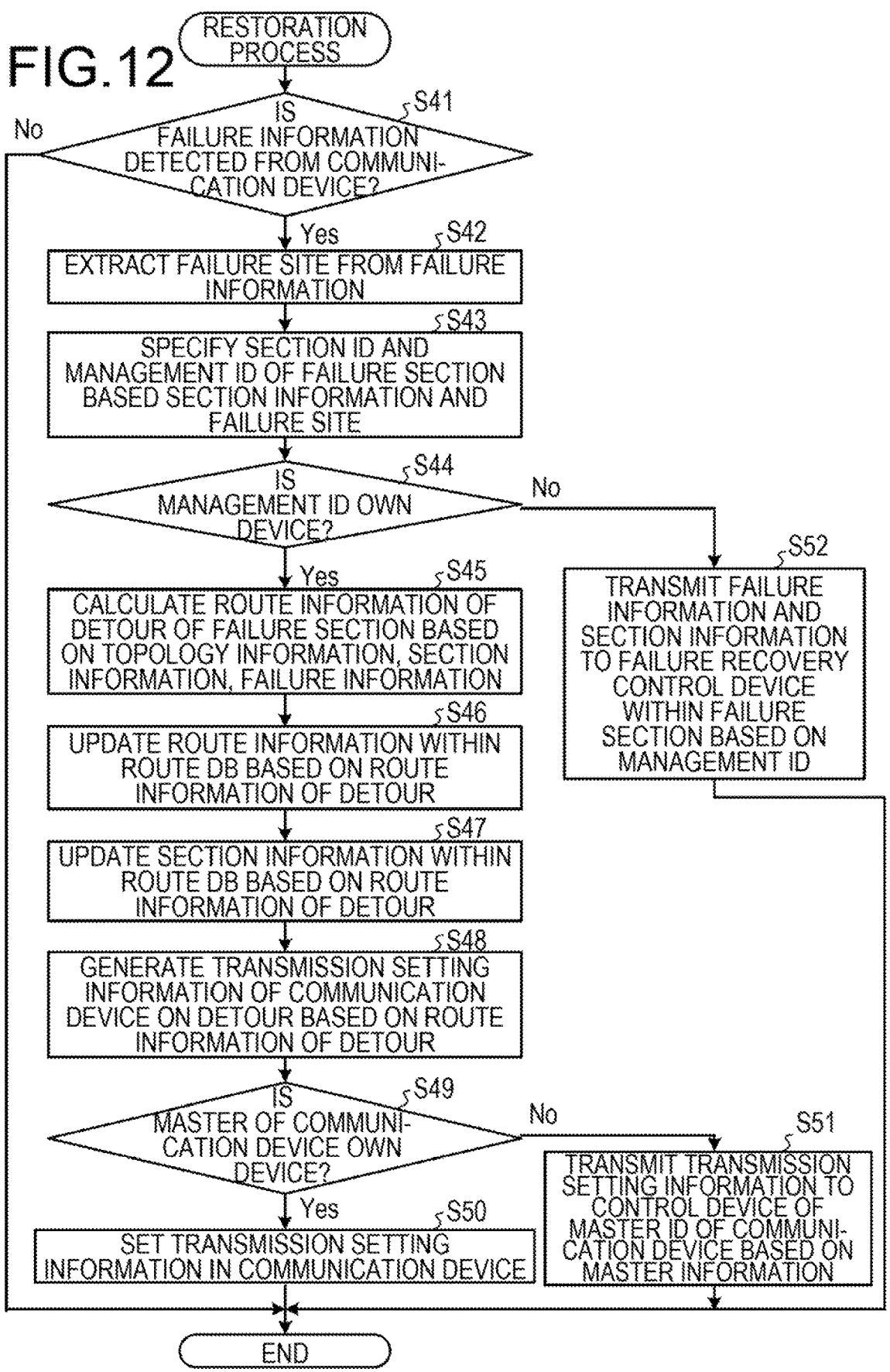

FIG. 13A
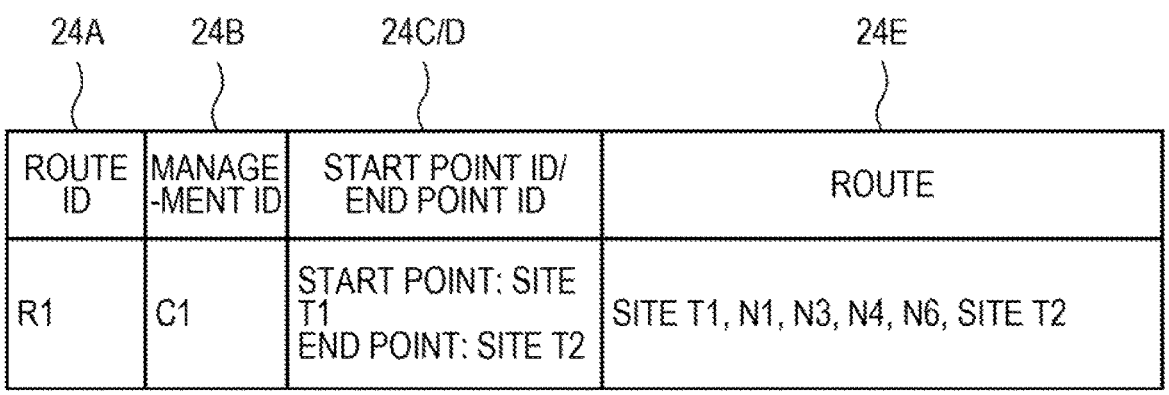

FIG. 13B

| SECTION ID | ROUTE ID | MANAGE-MENT ID | START POINT ID/ END POINT ID | ROUTE |
|---|---|---|---|---|
| SG1 | R1 | C1 | START POINT: SITE T1<br>END POINT: LINK BETWEEN N3-N4 | SITE T1, N1, N3, LINK BETWEEN N3-N4 |
| SG2 | R1 | C4 | START POINT: N4<br>END POINT: SITE T2 | N4, N6, SITE T2 |

| SECTION ID | ROUTE ID | MANAGE-MENT ID | START POINT ID/ END POINT ID | ROUTE |
|---|---|---|---|---|
| SG1 | R1 | C1 | START POINT: SITE T1<br>END POINT: LINK BETWEEN N2-N5 | SITE T1, N1, N2, LINK BETWEEN N2-N5 |
| SG2 | R1 | C4 | START POINT: N5<br>END POINT: T2 | N5, N6, SITE T2 |

FIG. 19

| SECTION ID (25A) | ROUTE ID (25B) | MANAGEMENT ID (25C) | START POINT ID/END POINT ID (25D/E) | ROUTE (25F) |
|---|---|---|---|---|
| SG1 | R2 | C1 | START POINT: SITE T1 END POINT: LINK BETWEEN N2-N3 | SITE T1, N1, N2, LINK BETWEEN N2-N3 |
| SG2 | R2 | C2 | START POINT:N3 END POINT:LINK BETWEEN N4-N5 | N3, N4, LINK BETWEEN N4-N5 |
| SG3 | R2 | C3 | START POINT:N5 END POINT:LINK BETWEEN N5-N6 | N5, LINK BETWEEN N5-N6 |
| SG4 | R2 | C4 | START POINT:N6 END POINT: SITE T2 | N6, SITE T2 |

| SECTION ID (25A) | ROUTE ID (25B) | MANAGEMENT ID (25C) | START POINT ID/END POINT ID (25D/E) | ROUTE (25F) |
|---|---|---|---|---|
| SG1 | R2 | C1 | START POINT: SITE T1 END POINT: LINK BETWEEN N2-N3 | SITE T1, N1, N2, LINK BETWEEN N2-N3 |
| SG2 | R2 | C2 | START POINT:N3 END POINT:LINK BETWEEN N4-N5 | N3, N4, LINK BETWEEN N4-N5 |
| SG3 | R2 | C3 | START POINT:N5 END POINT: SITE T2 | N5, N6, SITE T2 |

FIG. 22

|     | CONTROL DEVICE C1 | CONTROL DEVICE C2 | CONTROL DEVICE C3 | CONTROL DEVICE C4 |
|-----|------|-----|-----|-----|
| N1  | 1    | 5   | 100 | 105 |
| N2  | 1    | 5   | 100 | 105 |
| N3  | 5    | 5   | 90  | 95  |
| N4  | 5    | 5   | 90  | 95  |
| N5  | 100  | 95  | 1   | 5   |
| N6  | 105  | 100 | 5   | 1   |

| SECTION ID | ROUTE ID | MANAGEMENT ID | START POINT ID/ END POINT ID | ROUTE |
|---|---|---|---|---|
| | 25A | 25B | 25C | 25D/E | 25F |
| SG1 | R2 | C1 | START POINT:N3 END POINT: LINK BETWEEN N4-N5 | SITE T1, N1, N2, N3, N4, LINK BETWEEN N4-N5 |
| SG2 | R2 | C3 | START POINT:N5 END POINT: SITE T2 | N5, N6, SITE T2 |

COMMUNICATION CONTROL DEVICE AND COMMUNICATION SYSTEM

CROSS-REFERENCE TO RELATED APPLICATION

This application is based upon and claims the benefit of priority of the prior Japanese Patent Application No. 2016-031349, filed on Feb. 22, 2016, the entire contents of which are incorporated herein by reference.

FIELD

The embodiments discussed herein are related to a communication control device and a communication system.

BACKGROUND

A software defined networking (SDN) technique has been known in which for the purpose of quickly executing, for example, a change of route setting on a network (hereinafter, simply referred to as NW), a communication device is specified in a simple transmission function, and the operation of the communication device is unitarily controlled by a control device. However, in the SDN, when the control device is implemented with one server, the function of the control device may not keep up with the expansion of the NW scale.

Thus, in a distributed communication control system, a plurality of control devices having the same function are provided, and each of the control devices undertakes a control of each communication device within the NW. Of the plurality of control devices, a control device responsible for a control of a communication device is called a master control device. In the distributed communication control system, the master control device is dynamically changed, for example, in order to distribute the load of the control devices. In addition, the distributed communication control system may include an open network operating system (ONOS).

Process functions executed by a control device within the distributed communication control system include a route setting to set a route on a NW and a failure recovery to restore a failure of the route. The route setting sets transmission setting information in a communication device on a route, in order to establish a route between sites (or terminals or the like) connected to a NW according to a request from a user or an operator of the NW. As for the failure recovery, when a failure occurs in the set route, in order to restore the failure, a detour of the failure on the route is calculated so as to ensure the continuance of the communication between the sites.

Related technologies are disclosed in, for example, Japanese Laid-Open Patent Publication No. 2012-169889, Japanese National Publication of International Patent Application No. 2015-508622, and Japanese Laid-Open Patent Publication No. 2008-054233.

SUMMARY

According to an aspect of the invention, a communication control device for controlling a communication device on a communication network, the communication control device including: a memory; a processor coupled with the memory and configured to: divide a route for a communication with the communication device into a plurality of sections; determine a communication control device for a failure recovery in a section of the plurality of sections, the communication control device for the failure recovery restoring a failure in the section of the plurality of sections; specify a section of the plurality of sections where the failure occurs when the failure is detected on the route; transmit failure information to the communication control device for the failure recovery corresponding to the section specified; and set a detour to the failure in the section, based on the failure information.

The object and advantages of the disclosure will be realized and attained by means of the elements and combinations particularly pointed out in the claims.

It is to be understood that both the foregoing general description and the following detailed description are exemplary and explanatory and are not restrictive of the disclosure, as claimed.

BRIEF DESCRIPTION OF DRAWINGS

FIG. 4 is an explanatory view illustrating an example of master information;

FIG. 5 is an explanatory view illustrating an example of route information;

FIG. 6 is an explanatory view illustrating an example of section information;

FIG. 8 is an explanatory view illustrating an example of section information before and after restoration;

FIG. 12 is a flow chart illustrating an exemplary process operation of the CPU within the control device with regard to a restoration process;

FIG. 13A is an explanatory view illustrating an example of route information before and after restoration;

FIG. 13B is an explanatory view illustrating an example of section information before and after restoration;

FIG. 19 is an explanatory view illustrating an example of section information before and after integration;

FIG. 22 is an explanatory view illustrating an example of delay information;

DESCRIPTION OF EMBODIMENTS

In the distributed communication control system, each communication device has a control device which controls the communication device or a control device for failure recovery in each route between sites to cope with a failure of the route. Upon detecting a failure on a route, the control device for failure recovery sets a detour to avoid the failure site on the route.

However, even though the distributed communication control system provides the control device for failure recovery in each route, for example, when the route extends over a wide area, the distance between each communication device on the route and the control device for failure recovery becomes long. As a result, when a failure occurs on a route, in a case where the control device for failure recovery is distant from the failure site, it takes much time for the control device for failure recovery to cope with the failure due to, for example, communication delay.

Hereinafter, descriptions will be made in detail on embodiments of a communication control device and a communication system in which time required to cope with a failure may be reduced. Meanwhile, the present disclosure is not limited to the embodiments. Further, the embodiments may be appropriately combined with each other in a range that does not cause inconsistency.

First Embodiment

Figure 1:
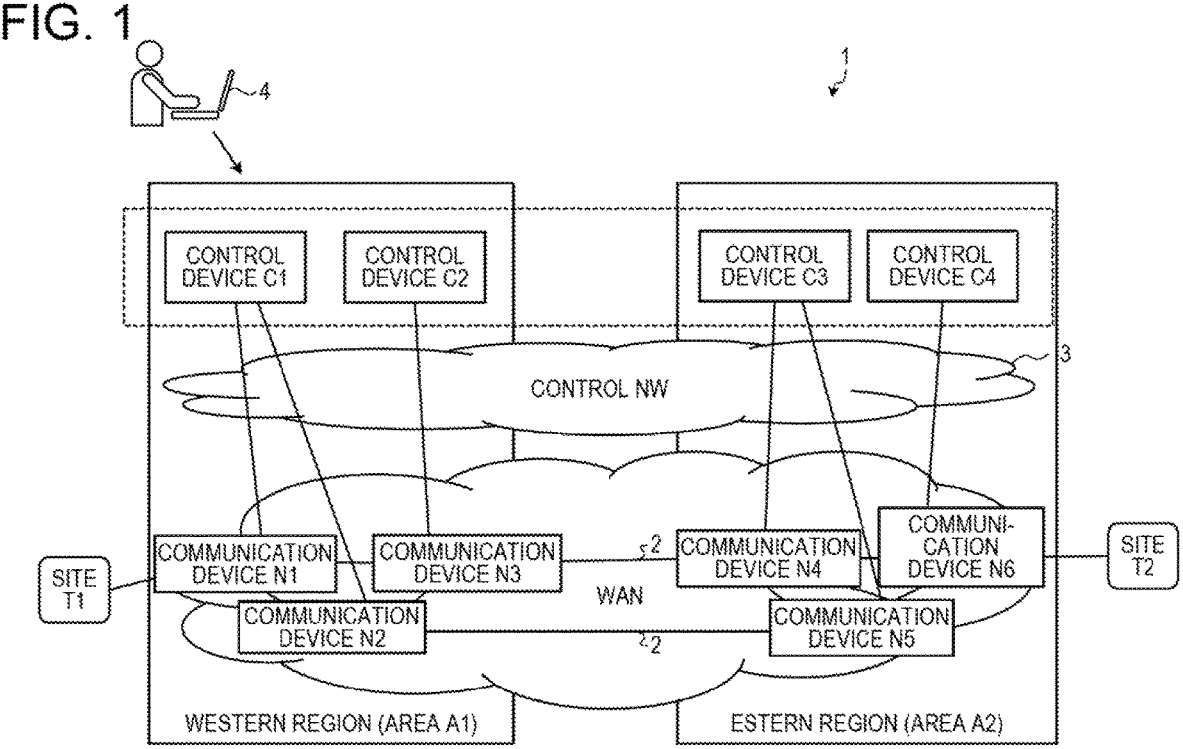
FIG. 1 is an explanatory view illustrating an example of a communication system of First Embodiment.

FIG. 1 is an explanatory view illustrating an example of a communication system 1 of First Embodiment. The communication system 1 illustrated in FIG. 1 includes a plurality of communication devices N which communicate with each other through, for example, a wide area network (WAN) 2, a plurality of control devices C which control the communication devices N, respectively, via, for example, a control NW 3, a user terminal 4, and a plurality of sites T. In the communication system 1, each of the control devices C controls each of the communication devices N. For example, the SDN technique is adopted. Here, for convenience of descriptions, the communication devices N are, for example, N1 to N6, and the control devices C are, for example, C1 to C4. In the communication system 1, for example, a route between sites T1 and T2 is established via the communication devices N on the WAN 2.

The user terminal 4 requests route setting between the sites T1 and T2 via the plurality of communication devices N on the WAN 2. In response to the setting request from the user terminal 4, the control devices C set transmission setting information in the communication devices N controlled by the control devices C. For example, in a case of transmission setting information of the communication device N1, the transmission setting information indicates, for example, that a packet from the site T1 toward the site T2 is to be transmitted to the communication device N2. For example, in a case of transmission setting information of the communication device N2, the transmission setting information indicates, for example, that a packet from the communication device N1 toward the site T2 is to be transmitted to the communication device N3. It is assumed that the transmission setting information is described to conform to, for example, API of OpenFlow protocol.

For example, the control device C1 is a master control device C that controls the communication devices N1 and N2, and the control device C2 is a master control device C that controls the communication device N3. In addition, the control device C3 is a master control device C that controls the communication devices N4 and N5, and the control device C4 is a master control device C that controls the communication device N6. The communication system 1 divides the area into an area A1 of the western region and an area A2 of the eastern region. The control devices C1 and C2 and the communication devices N1, N2, and N3 are arranged in and belong to the area A1, and the control devices C3 and C4 and the communication devices N4, N5, and N6 are arranged in and belong to the area A2.

Figure 2:
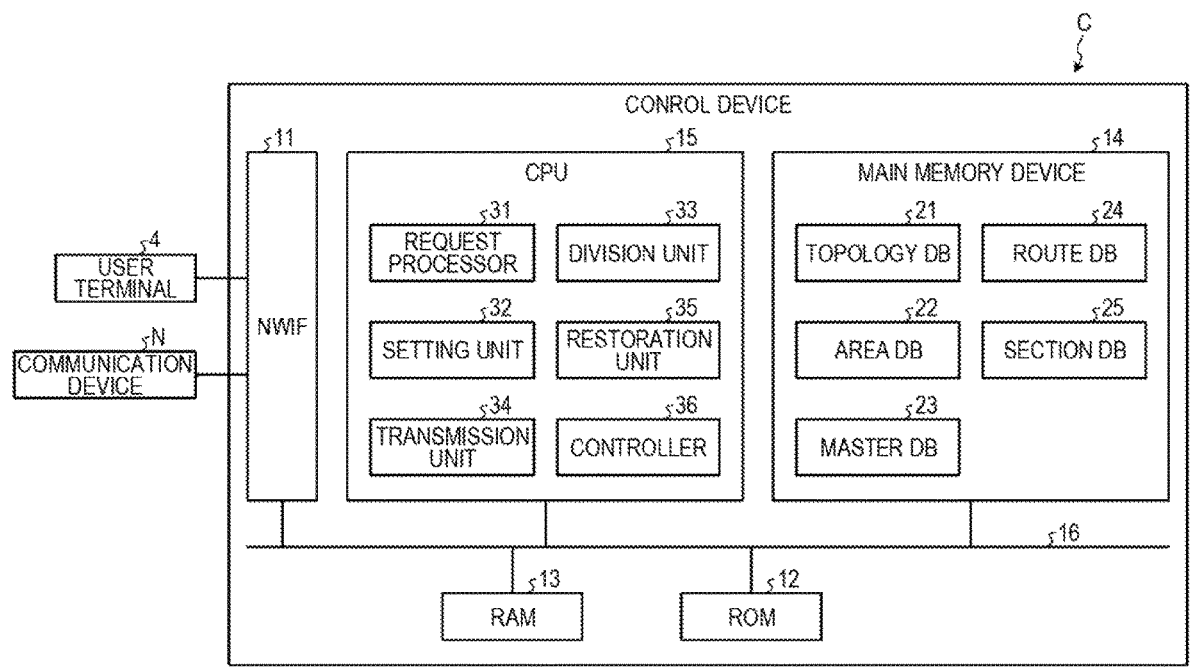
FIG. 2 is a block diagram illustrating an exemplary configuration of a control device of First Embodiment.

FIG. 2 is an exemplary view illustrating an example of a control device C of First Embodiment. The control device C illustrated in FIG. 2 includes a network interface (NWIF) 11, a read only memory (ROM) 12, a random access memory (RAM) 13, a main memory device 14, a central processing unit (CPU) 15, and a data bus 16. The NWIF 11 is responsible for a communication with the control NW 3. The ROM 12 stores various programs or data used by the CPU 15 to execute each program. The RAM 13 loads, for example, the programs stored in the ROM 12 and is used as a work area of the CPU 15. The main memory device 14 includes areas that store various types of information. The CPU 15 controls the entire control device C. The CPU 15 executes various processes as functions by loading the programs stored in the ROM 12 to the RAM 13 and executing the programs.

Figure 3:
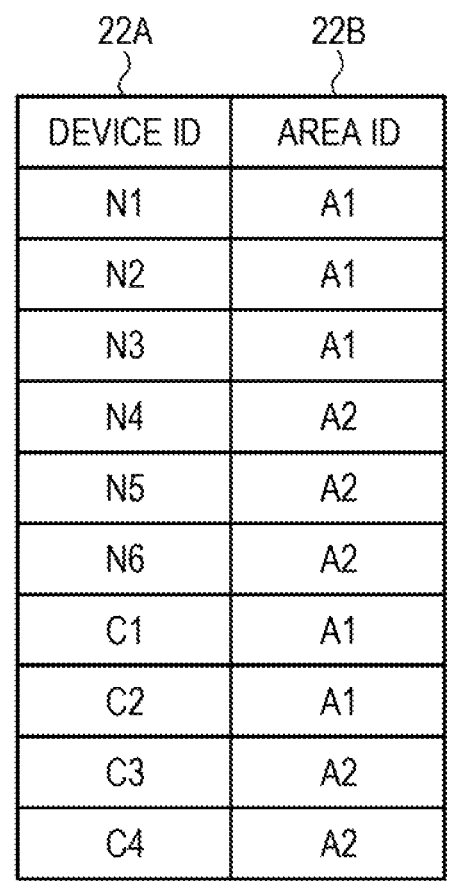
FIG. 3 is an explanatory view illustrating an example of area information.

The main memory device 14 includes functions of a topology database (DB) 21, an area DB 22, a master DB 23, a route DB 24, and a section DB 25. The topology DB 21 stores therein topology information including a link configuration between communication devices N on the WAN 2, i.e., a topology configuration. The area DB 22 stores therein area information for managing area identification (ID) indicating a region of an arrangement site of each of communication devices N and control devices C. FIG. 3 is an explanatory view illustrating an example of the area information. The area information illustrated in FIG. 3 are information for managing device ID 22A and area ID 22B which are associated with each other. The device ID 22A is an ID for identifying a control device C or a communication device N. The area ID 22B is an ID for identifying an area. By referring to the area information illustrated in FIG. 3, the CPU 15 identifies that the communication devices N1 to N3 belong to the area A1, the communication devices N4 to N6 belong to the area A2, the control devices C1 and C2 belong to the area A1, and the control devices C3 and C4 belong to the area A2.

The master DB 23 stores therein master information for managing a master control device C of each communication device N. FIG. 4 is an explanatory view illustrating an example of the master information. The master information illustrated in FIG. 4 are information for managing communication device ID 23A and master ID 23B which are associated with each other. The communication device ID 23A is an ID for identifying a communication device N. The master ID 23B is an ID for identifying a master control device C. By referring to the master information illustrated in FIG. 4, the CPU 15 identifies that a master of the communication devices N1 and N2 is the control device C1, a master of the communication device N3 is the control device C2, a master of the communication devices N4 and N5 is the control device C3, and a master of the communication device N6 is the control device C4.

The route DB 24 stores therein route information when setting a route on the WAN 2. FIG. 5 is an explanatory view illustrating an example of the route information. The route information illustrated in FIG. 5 are information for managing route ID 24A, management ID 24B, start point ID 24C, end point ID 24D, and a route 24E which are associated with each other. The route ID 24A identifies a route. The management ID 23B identifies a control device C managing the route. The start point ID 24C identifies a start point of the route. The end point ID 24D identifies an end point of the route. The route 24E is a list indicating a route sequence of communication devices N that pass from the start point to the end point on the route. By referring to the route information illustrated in FIG. 5, the CPU 15 identifies that a control device C managing a route R1 is the control device C1, a start point is the site T1, an end point is the site T2, and a route is the site T1, the communication devices N1, N3, N4, and N6, and the site T2.

The section DB 25 stores therein section information when dividing a route. FIG. 6 is an explanatory view illustrating an example of the section information. The section information illustrated in FIG. 6 are information for managing section ID 25A, route ID 25B, management ID 25C, start point ID 25D, end point ID 25E, and a route 25F which are associated with each other. The section ID 25A identifies a section. The route ID 25B identifies a route including the section. The management ID 25C identifies a control device C for failure recovery that performs failure restoration when a failure occurs within the section. The start point ID 25D identifies a start point of the section. The end point ID 25E identifies an end point of the section. The route 25F is a list indicating a route sequence of communication devices N that pass from the start point to the end point within the section. By referring to the section information illustrated in FIG. 6, the CPU 15 identifies that a section SG1 is included in the route R1, a control device C for failure recovery of the section is the control device C1, a start point is the site T1, an end point is the link between the communication devices N3 and N4, and a route is the site T1, the communication devices N1 and N3, and the link between the communication devices N3 and N4. By referring to the section information illustrated in FIG. 6, the CPU 15 identifies that a section SG2 is included in the route R1, a control device C for failure recovery of the section is the control device C4, a start point is the communication device N4, an end point is the site T2, and a route is the communication devices N4 and N6 and the site T2.

In addition, a control device C within the same distributed communication control system synchronizes the information within the topology DB 21, the area DB 22, the master DB 23, the route DB 24, and the section DB 25 with other control devices C.

The CPU 15 includes, as process functions thereof, a request processor 31, a setting unit 32, a division unit 33, a transmission unit 34, a restoration unit 35, and a controller 36. The request processor 31 executes various processes according to a request from the user terminal 4. The request processor 31 calculates an optimum route on the WAN 2 according to a route setting request from the user terminal 4. In addition, the route setting request includes a start point and an end point of a route. Based on the start point and the end point within the route setting request and the topology information within the topology DB 21, the request processor 31 calculates an optimum route between the start point and the end point by, for example, the Dijkstra's algorithm. Further, the request processor 31 generates transmission setting information for each communication device N passing the calculated route. The request processor 31 generates route information including route ID 24A for identifying the route, management ID 24B for identifying control devices C managing the route, start point ID 24C and end point ID 24D for identifying the start point and the end point of the route, and the route 24E that indicates a route sequence of communication devices N on the route. The request processor 31 stores the generated route information in the route DB 24. The request processor 31 notifies the setting unit 32 of the transmission setting information for each communication device N, so as to set the transmission setting information for each communication device N on the route in the communication device N.

The division unit 33 divides the calculated route into a plurality of sections and determines a control device C for failure recovery among control devices C controlling communication devices N in each section. The division unit 33 sequentially designates the communication devices N within the route of the calculated route information from the start point, and converts the device IDs of the designated communication devices N into area IDs by referring to the area information within the area DB 22. The division unit 33 determines whether an area change point is present on the route, by referring to the route after the area ID conversion. When it is determined that an area change point is present, the division unit 33 specifies the area change point. The division unit 33 divides the route into sections based on the specified area change point. Further, the division unit 33 determines a control device C for failure recovery of each section, among the master control devices C controlling the communication devices N within the section. The division unit 33 determines, for example, a control device C controlling the smallest number of communication devices N, as a control device C for failure recovery, among the master control devices C controlling the communication devices N within the section. Then, the division unit 33 generates section information including section ID 25A of a section, route ID 25B of a route, management ID 25C of a control device C for failure recovery of a section, start point ID 25D and end point ID 25E of a section, and a route 25F indicating a route sequence of communication devices N on a section. The division unit 33 stores the generated section information in the section DB 25.

The setting unit 32 sets transmission setting information in each communication device N of each section within the route. For example, the OpenFlow protocol is used for the setting of communication devices N. In a case of a communication device N of which a master control device C is its own device of the CPU 15, the setting unit 32 sets transmission setting information corresponding to the communication device N. In a case of a communication device N of which a master control device C is another control device C, the setting unit 32 transmits transmission setting information of the communication device N to the master control device C controlling the communication device N.

Upon detecting failure information from a communication device N, the transmission unit 34 specifies section ID of a section including the failure site by referring to the section information within the section DB 25, based on the communication device ID of the communication device N as the notification destination within the failure information.

Further, the transmission unit 34 transmits the failure information to a control device C of management ID corresponding to the section ID of the section including the failure site, i.e., a control device C for failure recovery.

The restoration unit 35 is a processor that restores a failure of a failure section. The restoration unit 35 calculates a detour to avoid a failure site by, for example, the Dijkstra's algorithm, based on the failure information, the section information of the failure section, and the topology information. The restoration unit 35 generates transmission setting information for each communication device N passing the calculated detour. Based on the transmission setting information of the detour, the restoration unit 35 updates contents of the route information including the failure site within the route DB 24. Further, based on the transmission setting information of the detour, the restoration unit 35 updates contents of the section information including the failure site within the section DB 25. The restoration unit 35 notifies the setting unit 32 of the transmission setting information for each communication device N, so as to set the transmission setting information of each communication device N on the route in the communication device N.

The controller 36 controls the entire CPU 15. The controller 36 synchronizes the information within the topology DB 21, the area DB 22, the master DB 23, the route DB 24, and the section DB 25 with control devices C.

Figure 7:
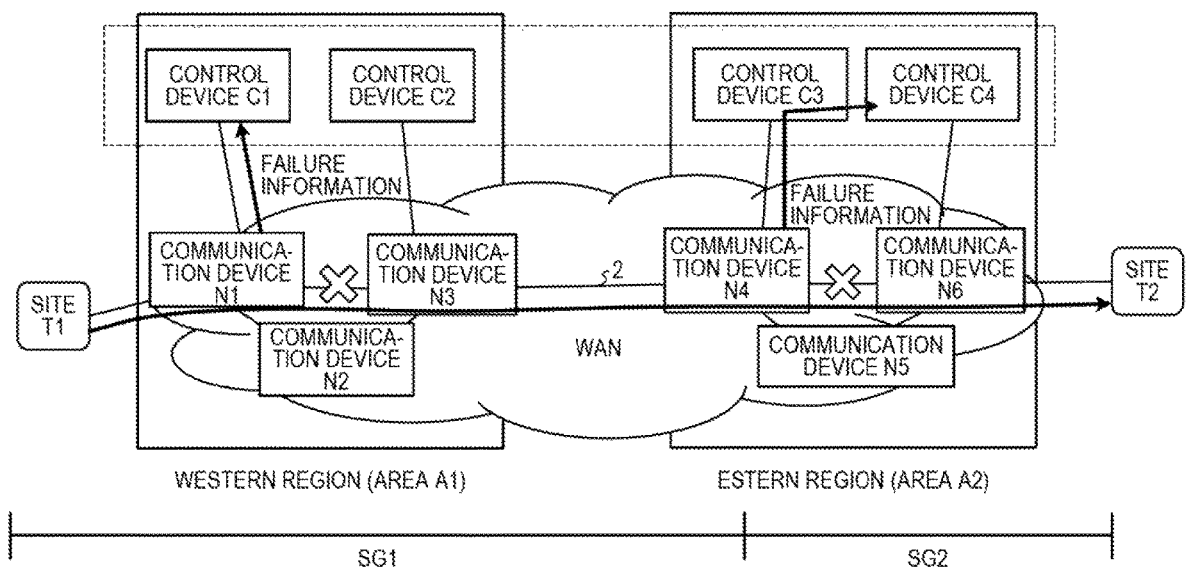
FIG. 7 is an explanatory view illustrating an example of a failure occurrence within the communication system.

FIG. 7 is an explanatory view illustrating an example of a failure occurrence within the communication system 1. Here, for convenience of descriptions, the route between the sites T1 and T2 is the communication devices N1, N3, N4, and N6, and the section of the route is divided into the sections SG1 and SG2. In addition, the section SG1 reaches from the site T1 to the communication devices N1 and N3, and the link between N3 and N4, and the section SG2 reaches from the communication devices N4 to N6 to the site T2. In addition, a control device C for failure recovery of the section SG1 is the control device C1, and a control device C for failure recovery of the section SG2 is the control device C4. In addition, a master control device C of the communication device N1 is the control device C1, a master control device C of the communication device N3 is the control device C2, a master control device C of the communication device N4 is the control device C3, and a master control device C of the communication device N6 is the control device C4.

When a failure is detected on the link between the communication devices N1 and N3, the communication device N1 notifies failure information to the control device C1 that is a master of the communication device N1. Upon detecting the failure information from the communication device N1, the restoration unit 35 within the control device C1 calculates a detour of the communication devices N1, N2, and N3 to avoid the failure site, and updates the route information within the route DB 24 to transmission setting information of the detour.

In addition, when a failure is detected on the link between the communication devices N4 and N6, the communication device N4 notifies failure information to the control device C3 that is a master of the communication device N4. The control device C3 specifies the failure section of the failure site within the failure information, and specifies management ID corresponding to the failure section by referring to the section information within the section DB 25. Further, based on the management ID corresponding to the specified failure section, the control device C3 transmits the failure information to the control device C4 for failure recovery of the failure section. Upon detecting the failure information from the control device C3, the restoration unit 35 within the control device C4 calculates a detour of the communication devices N4, N5, and N6 to avoid the failure site, and updates the route information within the route DB 24 to transmission setting information of the detour.

In the communication system 1, since a route is divided into a plurality of sections, and a control device C for failure recovery is arranged in each section, the distance between a failure site and the control device C for failure recovery is close, as compared to that in related technologies.

Subsequently, the operation of the communication system 1 of First Embodiment will be described. First, the operation of the request processor 31 within a control device C will be described. For example, upon detecting a request for route setting between the sites T1 and T2 from the user terminal 4, the request processor 31 within the control device C1 calculates the route between the sites T1 and T2 based on the topology information by using the Dijkstra's algorithm. That is, the request processor 31 calculates the route of the site T1, the communication devices N1, N3, N4, and N6, and the site T2. Further, the request processor 31 generates transmission setting information for each of the communication devices N1, N3, N4, and N6, and notifies the setting unit 32 of the transmission setting information of each communication device N.

The operation of the division unit 33 within the control device C1 will be described. The division unit 33 acquires route information including, for example, the route of the site T1, the communication devices N1, N3, N4, and N6, and the site T2. By referring to the area information within the area DB 22, the division unit 33 converts the communication devices N1, N3, N4, and N6 into A1(N1), A1(N3), A2(N4), and A2(N6) on the route after the area ID conversion. The division unit 33 determines whether an area change point where an area ID changes is present, by referring to the route after the area ID conversion. Since an area change point is present between the communication devices N3(A1) and N4(A2), the division unit 33 specifies the area change point. Based on the specified area change point, the division unit 33 divides the route into the section SG1 reaching from the site T1 to the link between the communication devices N3 and N4 through the communication devices N1 and N3, and the section SG2 reaching from the communication device N4 to the site T2 through the communication device N6. Further, the division unit 33 determines the control device C1 for failure recovery of the section SG1 from the control devices C1 and C2 within the section SG1, and the control device C4 for failure recovery of the section SG2 from the control devices C3 and C4 within the section SG2.

Subsequently, the operation of the setting unit 32 within the control device C1 will be described. Since a master control device C of the communication device N1 is the control device C1, the setting unit 32 within the control device C1 sets transmission setting information of the communication device N1 in the communication device N1. In addition, since a master control device C of the communication device N3 is the control device C2, the setting unit 32 within the control device C1 transmits transmission setting information of the communication device N3 to the control device C2 to set the transmission setting information in the communication device N3. Since a master control device C of the communication device N4 is the control device C3, the setting unit 32 within the control device C1 transmits transmission setting information of the communication device N4 to the control device C3 to set the transmission setting information in the communication device N4. Since a master control device C of the communication device N6 is the control device C4, the setting unit 32 within the control device C1 transmits transmission setting information of the communication device N6 to the control device C4 to set the transmission setting information in the communication device N6.

Subsequently, the operation of the transmission unit 34 within the control device C3 will be described. Upon detecting failure information between the communication devices N4 and N6 from the communication device N4 under the control, the transmission unit 34 within the control device C3 specifies the failure section SG2 including the failure site from the failure information. When the failure section SG2 is specified, since a control device C for failure recovery within the section SG2 is the control device C4, the transmission unit 34 transmits the failure information to the control device C4 for failure recovery.

Subsequently, the operation of the restoration unit 35 within the control device C4 will be described. Upon detecting the failure information, the restoration unit 35 within the control device C4 for failure recovery calculates a detour of the failure site, based on the failure site within the failure information, the route within the section information, and the topology information. As a result, the restoration unit 35 obtains a detour of the communication devices N4, N5, and N6, and the site T2 within the section SG2. The restoration unit 35 generates transmission setting information of the communication devices N4 to N6 passing the detour and notifies the setting unit 32 of the transmission setting information. Further, based on the detour, the restoration unit 35 updates the section information within the section DB 25 and the route information within the route DB 24. In addition, the controller 36 notifies a signal for synchronizing the information within the section DB 25 and the route DB 24 of each control device C, to the other control devices C.

Figure 9:
FIG. 9 is an explanatory view illustrating an example of route information before and after restoration.

FIG. 8 is an explanatory view illustrating an example of section information before and after restoration, and FIG. 9 is an explanatory view illustrating an example of route information before and after restoration. In addition, it is assumed that a failure has occurred in the link between the communication devices N4 and N6 within the section SG2, and the failure has been restored by the detour passing the communication devices N4, N5, and N6. As for the section SG1 within the section information before the restoration as illustrated in FIG. 8, the route ID 25B is R1, the management ID 25C is the control device C1, the start point ID 25D is the site T1, the end point ID 25E is the link between the communication devices N3 and N4, and the route 25F is the site T1, the communication devices N1 and N3, and the link between the communication devices N3 and N4. As for the section SG2 within the section information before the restoration, the route ID 25B is R1, the management ID 25C is the control device C4, the start point ID 25D is the communication device N4, the end point ID 25E is the site T2, and the route 25F is the communication devices N4 and N6 and the site T2.

The section SG1 within the section information after the restoration is identical to that in the section information before the restoration. In the section SG2 within the section information after the restoration, while the route ID 25B, the management ID 25C, the start point ID 25D, and the end point ID 25E are identical to those in the section information after the restoration, the route 25F becomes the communication devices N4, N5, and N6, and the site T2.

In addition, in the route information before the restoration as illustrated in FIG. 9, the management ID 24B is the control device C1, the start point ID 24C is the site T1, the end point ID 24D is the site T2, and the route 25E is the site T1, the communication devices N1, N3, N4, and N6, and the site T2.

In the route information after the restoration, the management ID 24B, while the start point ID 24C, and the end point ID 24D are identical to those in the route information before the restoration, the route 24E becomes the site T1, the communication devices N1, N3, N4, N5, and N6, and the site T2.

Figure 10:
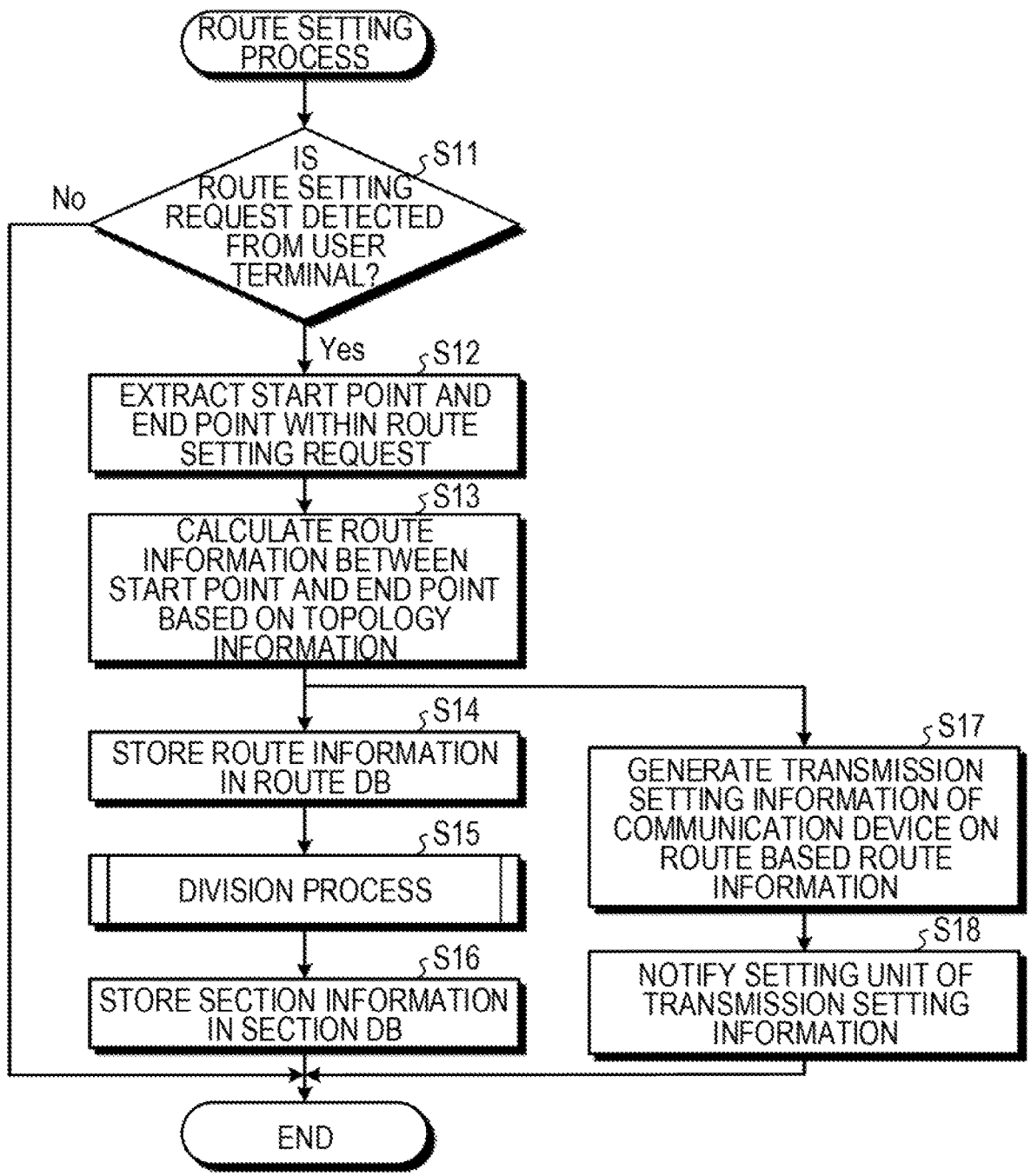
FIG. 10 is a flow chart illustrating an exemplary process operation of a CPU within a control device with regard to a route setting process.

FIG. 10 is a flow chart illustrating an exemplary process operation of the CPU 15 within a control device C with regard to a route setting process. The route setting process illustrated in FIG. 10 sets a route according to a route setting request from the user terminal 4. In FIG. 10, the request processor 31 within the CPU 15 of the control device C determines whether a route setting request is detected from the user terminal 4 (operation S11). When it is determined that the route setting request is detected ("Yes" of operation S11), the request processor 31 extracts a start point and an end point within the route setting request (operation S12). After extracting the start point and the end point, the request processor 31 calculates route information between the start point and the end point based on the topology information (operation S13). Further, the request processor 31 calculates route information of an optimum route between the start point and the end point, by using, for example, the Dijkstra's algorithm.

The request processor 31 stores the calculated route information in the route DB 24 (operation S14), and executes a division process to be described later, based on the route information (operation S15). In addition, the request processor 31 stores section information obtained from the division process in the section DB 25 (operation S16), and ends the process operation illustrated in FIG. 10.

Based on the calculated route information, the request processor 31 generates transmission setting information for each communication device N on the route (operation S17). The request processor 31 notifies the setting unit 32 of the generated transmission setting information (operation S18), and ends the process operation illustrated in FIG. 10. It is assumed that the CPU 15 executes the processes from the operation S14 to the operation S16 and the processes of the operations S17 and S18, for example, in parallel.

When it is determined that no route setting request is detected from the user terminal 4 ("No" of operation S11), the request processor 31 ends the process operation illustrated in FIG. 10.

The CPU 15 executing the route setting process illustrated in FIG. 10 calculates the route between the start point and the end point by using the Dijkstra's algorithm based on the start point and the end point within the route setting request and the topology information, generates transmission setting information for each communication device N on the route, and notifies the setting unit 32 of the transmission setting information. As a result, the CPU 15 may set the route between the start point and the end point according to the route setting request from the user terminal 4.

Figure 11:
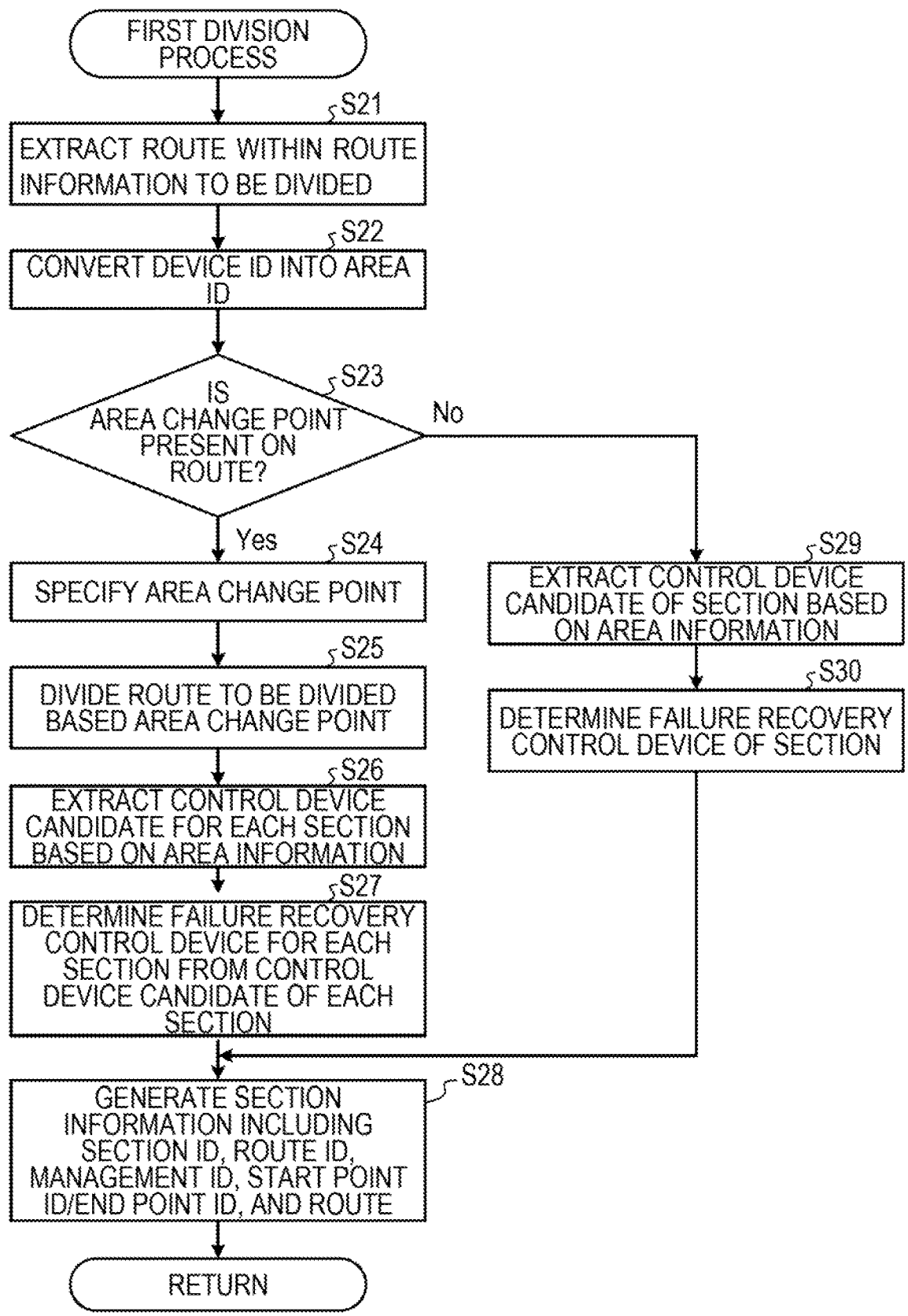
FIG. 11 is a flow chart illustrating an exemplary process operation of the CPU within the control device with regard to a first division process.

Subsequently, descriptions will be made on the operation when a first division process is executed as the division process executed in the operation S15 of FIG. 10. FIG. 11 is a flow chart illustrating an exemplary process operation of the CPU 15 within a control device C with regard to the first division process. The first division process illustrated in FIG. 11 divides a set route into sections in an area unit.

The division unit 33 within the CPU 15 extracts a route within route information to be divided (operation S21). Here, the route information to be divided is the route information calculated in operation S13 of FIG. 10. After extracting the route within the route information, the division unit 33 converts device ID of each communication device N within the route into area ID by referring to the area information within the area DB 22 (operation S22).

The division unit 33 determines whether a change point of area ID is present on the route after the area ID conversion (operation S23). When it is determined that a change point of area ID is present on the route ("Yes" of operation S23), the division unit 33 specifies the area change point (operation S24).

Based on the specified area change point, the division unit 33 divides the route to be divided into sections (operation S25). Based on the area information within the area DB 22, the division unit 33 extracts device IDs of control devices C in each section as device IDs of control device for failure recovery candidates (operation S26). The division unit 33 determines device ID of a control device C for failure recovery in each section from the device IDs of the control device for failure recovery candidates in each section (operation S27).

When the device ID of the control device C for failure recovery in each section is determined, the division unit 33 generates section information including section ID 25A, route ID 25B, management ID 25C, start point ID 25D, end point ID 25E, and a route 25E (operation S28). Then, the division unit 33 ends the process of the operation S15 illustrated in FIG. 10.

When it is determined that no area change point is present on the route after the area ID conversion ("No" of operation S23), the division unit 33 determines that the route is a single area, and extracts device IDs of control devices C in the section as device IDs of control device for failure recovery candidates based on the area information within the area DB 22 (operation S29). The division unit 33 determines device ID of a control device C for failure recovery in the section from the device IDs of the control device candidates of the section (operation S30), and proceeds to the operation S28 to generate section information.

The CPU 15 executing the first division process illustrated in FIG. 11 converts the device IDs of the communication devices N within the route of the route information into area IDs, and when an area change point is present on the route after the area ID conversion, the CPU 15 divides the route into a plurality of sections based on the area change point. As a result, the CPU 15 may divide the route into a plurality of sections in an area unit.

FIG. 12 is a flow chart illustrating an exemplary process operation of the CPU 15 within a control device C with regard to a restoration process. The restoration process illustrated in FIG. 12 is a process in which when a failure is detected on a route, a control device C for failure recovery within a section of the failure restores the failure. In FIG. 12, the restoration unit 35 within the CPU 15 of the control device C determines whether failure information is detected (operation S41). When it is determined that failure information is detected ("Yes" of operation S41), the restoration unit 35 extracts a failure site from the failure information (operation S42).

The restoration unit 35 specifies section ID and management ID of a failure section corresponding to the failure site by referring to the section information within the section DB 25 (operation S43). The restoration unit 35 determines whether the specified management ID is device ID of its own device of the CPU 15 (operation S44).

When it is determined that the management ID is the device ID of its own device ("Yes" of operation S44), the restoration unit 35 calculates route information of a detour of the failure site based on the topology information, the section information, and the failure information (operation S45). After calculating the route information of the detour of the failure section, the restoration unit 35 updates the route information within the route DB 24 based on the route information of the detour (operation S46). The restoration unit 35 updates the section information within the section DB 25 based on the route information of the detour (operation S47). Further, the restoration unit 35 sets transmission setting information of each communication device N in the detour based on the route information of the detour (operation S48), and determines whether master ID of each communication device N in the detour is the device ID of its own device of the CPU 15 by referring to the master information within the master DB 23 (operation S49).

When it is determined that master ID of each communication device N is the device ID of its own device ("Yes" of operation S49), the setting unit 32 sets the generated transmission setting information in the communication device N (operation S50), and ends the process operation illustrated in FIG. 12. When it is determined that master ID of each communication device N in the detour is not the device ID of its own device ("No" of operation S49), the setting unit 32 transmits the transmission setting information to a control device C of master ID corresponding to the communication device ID of the communication device N by referring to the master information within the master DB 23 (operation S51). Then, the setting unit 32 ends the process operation illustrated in FIG. 12.

When it is determined that the management ID is not the device ID of its own device ("No" of operation S44), the restoration unit 35 transmits the failure information and the section information to a control device C for failure recovery within the failure section based on the management ID (operation S52), and ends the process operation illustrated in FIG. 12. When it is determined that no failure information is detected from communication devices N ("No" of operation S41), the restoration unit 35 ends the process operation illustrated in FIG. 12.

When failure information is detected, the CPU 15 executing the restoration process illustrated in FIG. 12 specifies a control device C for failure recovery in the section corresponding to the failure site within the failure information, and when the control device C for failure recovery is its own device, the CPU 15 calculates a detour to avoid the failure section. Then, the CPU 15 updates the section information and the route information based on the detour, and generates transmission setting information for each communication device N on the detour to set the transmission setting information in each communication device N. As a result, the CPU 15 may quickly restore the failure on the route.

When the control device C for failure recovery is not its own device, the CPU 15 transmits the failure information to a control device C for failure recovery. As a result, the control device C for failure recovery may quickly restore the failure on the route.

Upon detecting failure information of a failure occurrence in the link between the communication devices N3 and N4 from the communication device N3, the control device C2 within the communication system 1 illustrated in FIG. 7 specifies the section SG1 which is the failure section within the failure information. When the failure section SG1 is specified, the control device C2 transmits the failure information to the control device C1 for failure recovery of the failure section SG1.

Upon detecting the failure information, the control device C1 for failure recovery may not calculate a detour of the section because the control device C1 for failure recovery is the end point within the section. Thus, the control device C1 for failure recovery calculates, for example, a detour of the communication devices N1, N2, N5, and N6, and the site T1, and updates the route information within the route DB 24 based on transmission setting information of the detour.

FIG. 13A is an explanatory view illustrating an example of the route information before and after the restoration. As for the route information before the restoration, the management ID 24B is the control device C1, the start point ID 24C is the site T1, the end point ID 24D is the site T2, the route 24E is the site T1, the communication devices N1, N3, N4, and N6, and the site T2. As for the route information after the restoration, while the management ID 24B, the start point ID 24C, and the end point ID 24D are identical to those in the route information before the restoration, the route 24E becomes the site T1, the communication devices N1, N2, N5, and N6, and the site T2.

Then, the control device C1 converts the device IDs of the communication devices N within the updated route information into area IDs, and divides the route information into a plurality of sections based on an area change point on the route after the area ID conversion. FIG. 13B is an explanatory view illustrating an example of the section information before and after the restoration. As for the section SG1 within the section information before the restoration, the route ID 25B is R1, the management ID 25C is the control device C1, the start point ID 25D is the site T1, the end point ID 25E is the link between the communication devices N3 and N4, and the route 25F is the site T1, the communication devices N1 and N3, and the link between the communication devices N3 and N4. As for the section SG2 within the section information before the restoration, the route ID 25B is R1, the management ID 25C is the control device C4, the start point ID 25D is the communication device N4, the end point ID 25E is the site T2, and the route 25F is the communication devices N4 and N6 and the site T2.

As for the section SG1 within the section information after the restoration, the route ID 25B, the management ID 25C, and the start point ID 25D are identical to those before the restoration. In addition, the end point ID 25E within the section SG1 becomes the link between the communication devices N2 and N5, and the route 25F becomes the site T1, the communication devices N1, N2, and the link between the communication devices N2 and N5. As for the section SG2 within the section information after the restoration, while the route ID 25B, the management ID 25C, and the end point ID 25E are identical to those before the restoration, the start point ID 25D becomes the communication device N5, and the route 25F becomes the communication devices N5 and N6, and the site T2. As a result, when a detour may not be calculated within the section, the failure is restored by the control device C managing the entire route.

The communication system 1 of First Embodiment converts communication devices N on a route into area IDs, and divides the route into a plurality of sections based on an area change point on the route after the area ID conversion so as to determine a control device C for failure recovery for each section. Further, a control device C specifies a section corresponding to a failure site when a failure is detected on a route, and transmits failure information to a control device for failure recovery which corresponds to the specified section. That is, in the communication system 1, since a control device C for failure recovery is provided in each section, the distance between a failure site and a control device C for failure recovery is close, as compared to that in related technologies. As a result, the time required to restore a failure may be reduced.

In the communication system 1 of First Embodiment, since a control device for failure recovery is provided in each section on a route, the failure recovery may be performed at a high speed. Further, in the communication system 1, in view of the route unit, a control device C for failure recovery C is changed depending on a failure occurring site, and in view of the section unit, one control device C copes with a failure within a certain section. As a result, the process consistency of the distributed communication control system is ensured so that different control devices C do not concurrently cope with one failure. Further, a matter which is required to be handled immediately (e.g., a failure) may be handled first, and a matter which does not require an immediate handling (e.g., route management) may be handled later.

A control device C of First Embodiment determines a control device C controlling the smallest number of communication devices N, among the plurality of control devices C within a section, as a control device C for failure recovery. As a result, a control device C having the smallest failure load may be determines as a control device C for failure recovery. In this case, as for the method of deciding a control device C for failure recovery, a control device controlling the smallest number of communication devices N is determined as a control device for failure recovery. However, the method is not limited thereto, and for example, a control device for failure recovery may be randomly determined.

In addition, the control device C for failure recovery of First Embodiment resets a detour of a failure and restores the failure based on transmission setting information of the detour. However, when a detour of a failure may not be reset, the control device C for failure recovery may transmit failure information relating to the failure to another control device C managing the route, and reset a detour of the failure site based on the failure information.

In the route setting process of FIG. 10, after the calculation of the route information in the operation S13, the processes of the operations S14 and S17 are executed in parallel. However, the processes may be executed in series. In the first division process of FIG. 11, the section information is generated even when no area change point is present on the route. However, the section information may not be generated.

The control device C of First Embodiment divides a route into a plurality of sections based on an area change point on the route. However, without being limited to the area change point, the control device C may convert each communication device N on a route within route information into master ID, and specify a master change point within the route after the master ID conversion so as to divide the route into a plurality of sections based on the master change point. An embodiment for this case will be described below as Second Embodiment.

Second Embodiment

Figure 14:
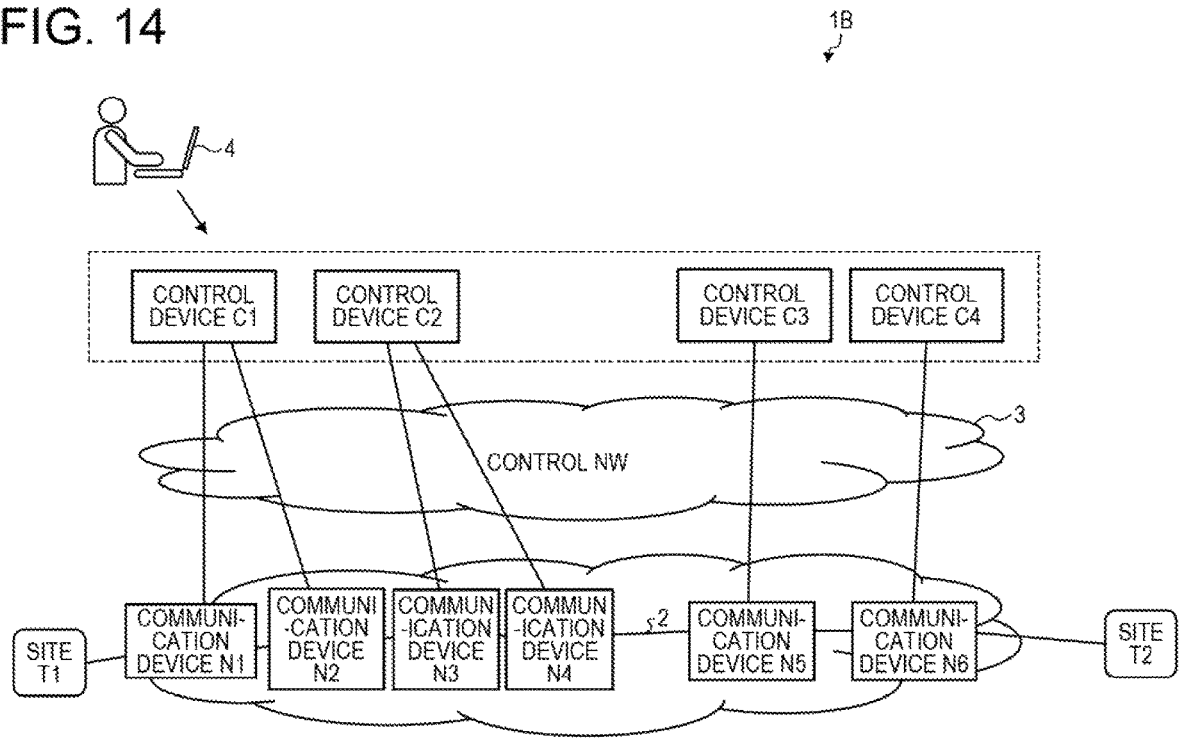
FIG. 14 is an explanatory view illustrating an example of a communication system of Second Embodiment.

FIG. 14 is an explanatory view illustrating an example of a communication system 1B of Second Embodiment. Here, for convenience of descriptions, the same components as those of the communication system 1 of First Embodiment will be denoted by the same reference numerals as used in First Embodiment, and thus, descriptions of overlapping configuration and operations will be omitted. The difference between the communication system 1 of First Embodiment and the communication system 1B of Second Embodiment lies in a division unit 33A which converts a route within route information into master ID, rather than area ID for identifying an area, and divides the route into a plurality of sections based on a master change point on the route.

In the communication system 1B illustrated in FIG. 14, a master control device C of the communication devices N1 and N2 is the control device C1, and a master control device C of the communication devices N3 and N4 is the control device C2. In addition, a master control device C of the communication device N5 is the control device C3, and a master control device C of the communication device N6 is the control device C4.

Figure 15:
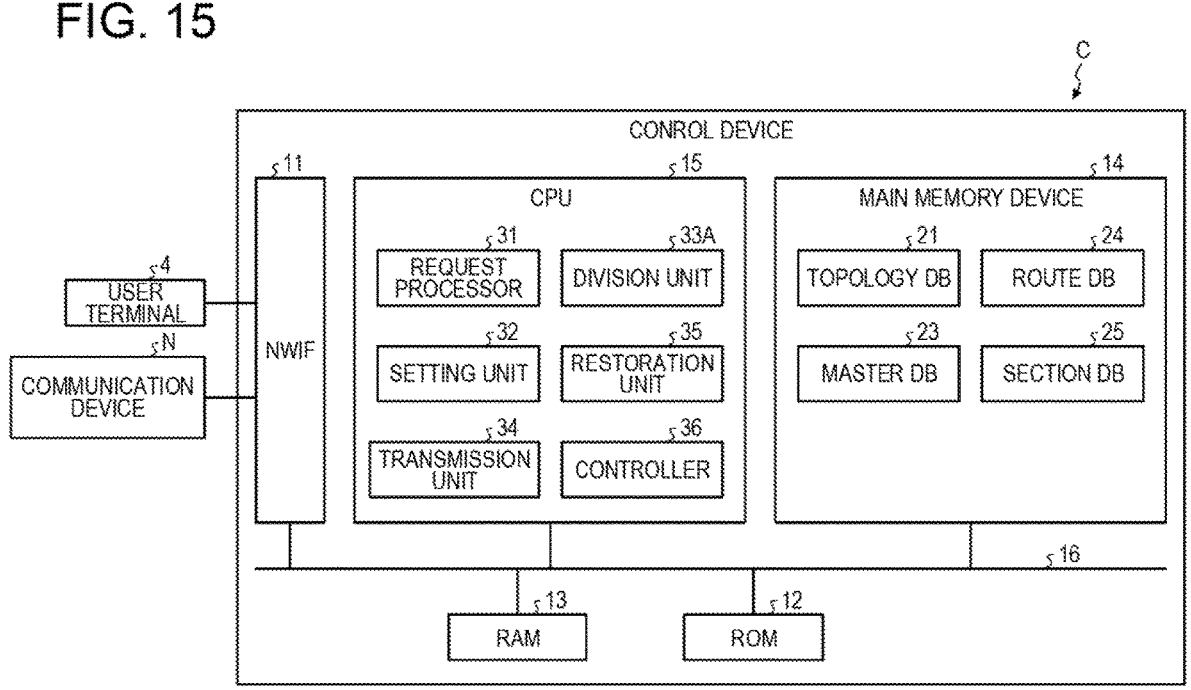
FIG. 15 is a block diagram illustrating an exemplary configuration of a control device of Second Embodiment.
Figure 16:
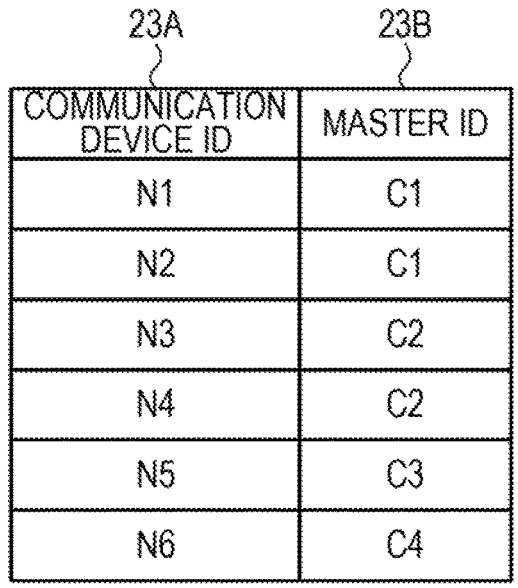
FIG. 16 is an explanatory view illustrating an example of master information.

FIG. 15 is a block diagram illustrating an exemplary configuration of a control device C of Second Embodiment. The main memory device 14 within the control device C illustrated in FIG. 15 is equipped therein with a topology DB 21, a master DB 23, a route DB 24, and a section DB 25. FIG. 16 is an explanatory view illustrating an example of master information. The master information illustrated in FIG. 16 manages communication device ID 23A and master ID 23B which are associated with each other.

Figure 17:
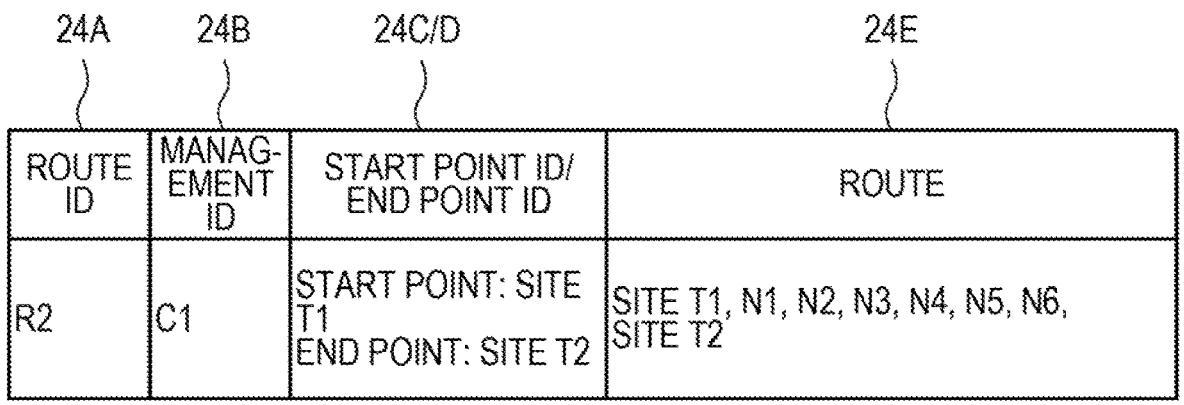
FIG. 17 is an explanatory view illustrating an example of route information.

FIG. 17 is an explanatory view illustrating an example of route information. Here, for convenience of descriptions, the route information is the site T1, the communication devices N1, N2, N3, N4, N5, and N6, and the site T2 as illustrated in FIG. 14. As the route information illustrated in FIG. 17, the route ID 24A is R2, the management ID 24B is the control device C1, the start point ID 24C is the site T1, the end point ID 24D is the site T2, the route 24E is the site T1, the communication devices N1, N2, N3, N4, N5, and N6, and the site T2.

The division unit 33A within the CPU 15 acquires the route information. The division unit 33A designates the communication devices N within the route of the route information with the start point and the end point, and converts the device IDs of the designated communication devices N into master IDs by referring to the master information within the master DB 23. The division unit 33 determines whether a master change point is present on the route, by referring to the route after the master ID conversion. When it is determined that a master change point is present within the route after the master ID conversion, the division unit 33A specifies the master change point. The division unit 33A divides the route into sections based on the specified master change point. Further, the division unit 33A determines a control device for failure recovery C of each section from the control devices C controlling the communication devices N within the section. The division unit 33A determines a master control device C controlling the communication devices N within the section as a control device C for failure recovery. Then, the division unit 33A generates section information including section ID 25A, route ID 25B, management ID 25C of a control device C for failure recovery of a section, start point ID 25D and end point ID 25E that identify a start point and an end point of a section, and a route 24E that indicates a route sequence of the communication devices N on a section. The division unit 33A stores the generated section information in the section DB 25.

Subsequently, the operation of the communication system 1B of Second Embodiment will be described. The operation of the division unit 33A within the control device C1 will be described.

It is assumed that the division unit 33A acquires, for example, route information including the route of the site T1, the communication devices N1, N2, N3, N4, N5, and N6, and the site T2. By referring to the master information within the master DB 23, the division unit 33A converts the communication devices N1, N2, N3, N4, N5, and N6 into C1(N1), C1(N2), C2(N3), C2(N4), C3(N5), and C4(N6) on the route after the master ID conversion. The division unit 33A determines whether a master change point is present on the route after the master ID conversion. When it is determined that a master change point is present, the division unit 33A specifies, for example, a master point between C1(N2) and C2(N3), a master point between C2(N4) and C3(N5), and a master point between C3(N5) and C4(N6). The division unit 33A divides the route into sections SG1, SG2, SG3, and SG4 based on the master change points. The division unit 33A generates section information for each section and stores the section information in the section DB 25.

Figure 18:
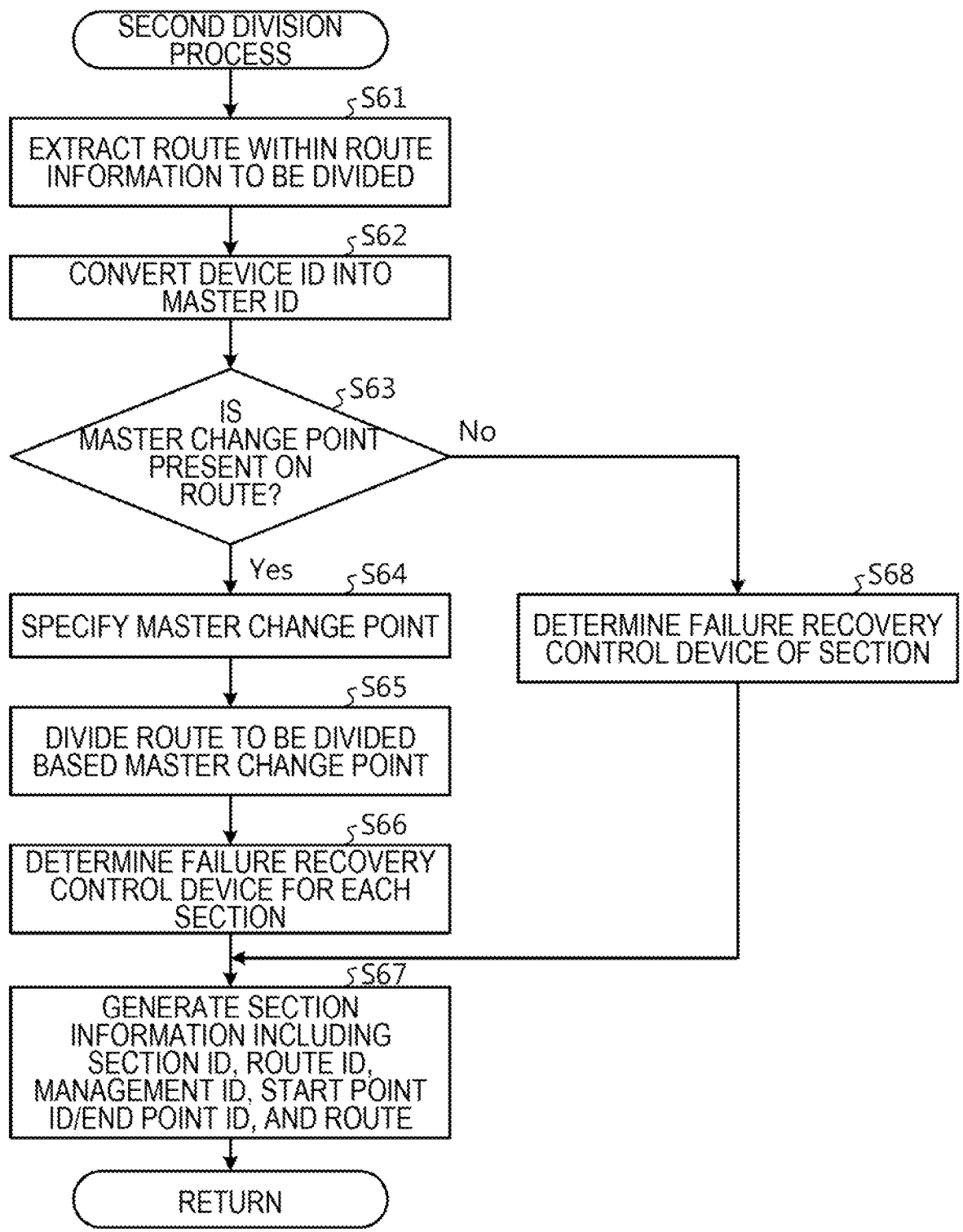
FIG. 18 is a flow chart illustrating an exemplary process operation of a CPU within a control device with regard to a second division process.

FIG. 18 is a flow chart illustrating an exemplary process operation of the CPU 15 within a control device C with regard to a second division process. In addition, it is assumed that the second division process illustrated in FIG. 18 is executed as the division process of the operation S15 of FIG. 10. The second division process illustrated in FIG. 18 divides the set route into sections in a master control device C unit. In FIG. 18, the division unit 33A within the CPU 15 of a control device C extracts the route within the route information to be divided (operation S61). After extracting the route, the division unit 33A converts device ID of each communication device N within the route into master ID by referring to the master information within the master DB 23 (operation S62).

The division unit 33A determines whether a change point of master ID (master change point) is present on the route after the master ID conversion (operation S63). When it is determined that a change point of master ID is present on the route, ("Yes" of operation S63), the division unit 33A specifies the master change point (operation S64).

The division unit 33A divides the route to be divided into sections based on the specified master change point (operation S65). The division unit 33A determines device ID of a control device C of each section as device ID of a control device C for failure recovery (operation S66).

When the device ID of the control device C for failure recovery of each section is determined, the division unit 33A generates section information including section ID 25A, route ID 25B, management ID 25C, start point ID 25D, end point ID 25E, and a route 25E (operation S67). Then, the division unit 33A ends the process of the operation S15 illustrated in FIG. 10.

When it is determined that a change point of master ID (master change point) is not present on the route ("No" of operation S63), the division unit 33A determines that a single master ID is present, and thus, determines the device ID of the control device C of the section as device ID of a control device C for failure recovery (operation S68). Then, the division unit 33A proceeds to the operation S67 to generate section information.

The CPU 15 executing the second division process illustrated in FIG. 18 converts device IDs of communication devices N within the route of the route information into master IDs, and when a master change point is present on the route after the conversion, the CPU 15 divides the route into sections based on the master change point. As a result, the CPU 15 may divide the route into a plurality of sections in a master control device C unit.

The control device C of Second Embodiment converts device ID of each communication device N on a route into master ID, and when it is determined that a master change point is present on the route, the control device C divides the route into sections based on the master change point. In view of the nature of the distributed communication control system, communication devices N are set by necessarily passing through masters. Therefore, when the division is executed based on master IDs as described above, the failure recovery may be implemented at the closest place to the communication devices N.

The control device C of Second Embodiment divides a route into a plurality of sections based on a master change point on a route. However, when the number of sections within a route excessively increases, a complicated process is required. Thus, after a route is divided into a plurality sections in the master control device C unit, when the number of communication devices N within a route of each section is less than a predetermined number, and the section where the number of communication devices N is less than the predetermined number is continuous, the CPU 15 may integrate the continuous sections with each other.

FIG. 19 is an explanatory view illustrating an example of section information before and after integration. The section information before integration is section information of the 4 sections SG1 to SG4. As for the section information of the section SG1, the route ID 25B is R2, the management ID 25C is the control device C1, the start point ID 25D is the site T1, the end point ID 25E is the link between the communication devices N2 and N3, and the route 25F is the site T1, the communication devices N1 and N2, and the link between the communication devices N3 and N4. As for the section information of the section SG2, the route ID 25B is R2, the management ID 25C is the control device C2, the start point ID 25D is the communication device N3, the end point ID 25E is the link between the communication devices N4 and N5, and the route 25F is the communication devices N3 and N4, and the link between the communication devices N4 and N5. As for the section information of the section SG3, the route ID 25B is R2, the management ID 25C is the control device C3, the start point ID 25D is the communication device N5, the end point ID 25E is the link between the communication devices N5 and N6, and the route 25F is the communication device N5 and the link between the communication devices N5 and N6. As for the section information of the section SG4, the route ID 25B is R2, the management ID 25C is the control device C4, the start point ID 25D is the communication device N6, the end point ID 25E is the site T2, and the route 25F is the communication device N6 and the site T2.

By referring to the routes of the sections, when the number of communication devices N within a route is less than a predetermined number, for example, 2, and the section where the number of communication devices N is less than the predetermined number is continuous, the division unit 33A integrates the continuous sections with each other. Since the number of the communication devices N in each of the sections SG3 and SG4 is less than the predetermined number, and the sections SG3 and SG4 are continuous, the division unit 33A integrates the sections SG3 and SG4 with each other. That is, the division unit 33A integrates the section information of the section SG4 with the section information of the section SG3. As for the section information of the section SG3 after the integration, the route ID 25B is R2, the management ID 25C becomes the control device C3, the start point ID 25D becomes the communication device N5, the end point ID 25E becomes the site T2, and the route 25F becomes the communication devices N5 and N6 and the site T2. As a result, an increase of the control load due to an excessive number of sections may be suppressed.

The control device C of Second Embodiment converts communication devices N on a route into master IDs, and divides the route into a plurality of sections based on a master change point on the route after the master ID conversion so as to determine a control device C for failure recovery for each section. Further, upon detecting a failure on a route, the control device C specifies a section corresponding to the failure site, and transmits failure information to a control device C for failure recovery corresponding to the specified section. As a result, the time required to restore a failure may be reduced.

When the number of communication devices N within a section in the master ID unit is less than a predetermined number, and the section where the number of communication devices N is less than the predetermined number is continuous, the control device C integrates the continuous sections with each other. As a result, the process complication caused by the excessive increase in the number of divisions may be suppressed. Further, when the number of communication devices N within a section is less than a predetermined number, and the section where the number of communication devices N is less than the predetermined number is continuous, the control device C integrates the continuous sections with each other. However, when the number of communication devices N within a section is less than the predetermined number, the section may be integrated with a previous or subsequent section thereof.

After dividing a route into a plurality of sections in the master control device C unit, when the number of communication devices N within a route of each section is less than the predetermined number, and the section where the number of communication devices N is less than the predetermined number is continuous, the CPU 15 integrates the continuous sections with each other. However, after dividing a route into a plurality of sections in the master control device C unit, when the number of communication devices N within a route of each of the sections is less than the predetermined number, and area IDs of the sections are the same, the CPU 15 may integrate the sections with each other.

In Second Embodiment, the number of communication devices N within a section is used as a determination criterion, but the number of spans of communication devices N within a section, rather than the number of communication devices N, may be used. In the second division process of FIG. 19, the section information is generated even when no master change point is present on a route. However, the section information may not be generated.

In Second Embodiment, a route is divided into a plurality of sections based on a master change point of master ID for each communication device N on the route. However, a route may be divided into a plurality of sections based communication delay time between each communication device N on a route and each control device C. An embodiment for this case will be described below as Third Embodiment.

Third Embodiment

Figure 20:
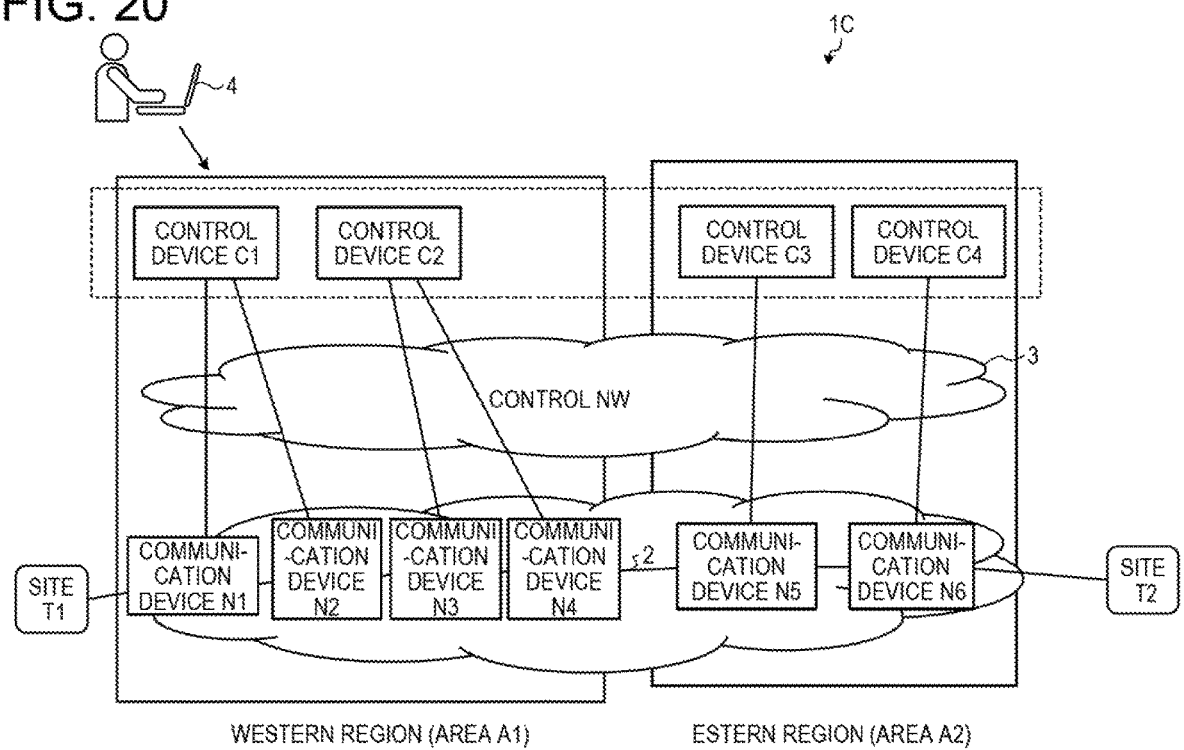
FIG. 20 is an explanatory view illustrating an example of a communication system of Third Embodiment.

FIG. 20 is an explanatory view illustrating an example of a communication system 1C of Third Embodiment. Here, for convenience of descriptions, the same components as those of the communication system 1 of First Embodiment will be denoted by the same reference numerals as used in First Embodiment, and descriptions of overlapping configuration and operations will be omitted. The difference between the communication system 1 of First Embodiment and the communication system 1C of Third Embodiment lies in a division unit 33B of the communication system 1C of Third Embodiment which divides a route into a plurality of sections based on communication delay time between a communication device N and a control device C, rather than area ID for identifying an area.

In the communication system 1C illustrated in FIG. 20, a master control device C of the communication devices N1 and N2 is the control device C1, and a master control device C of the communication devices N3 and N4 is the control device C2. A master control device C of the communication device N5 is the control device C3, and a master control device C of the communication device N6 is the control device C4.

Figure 21:
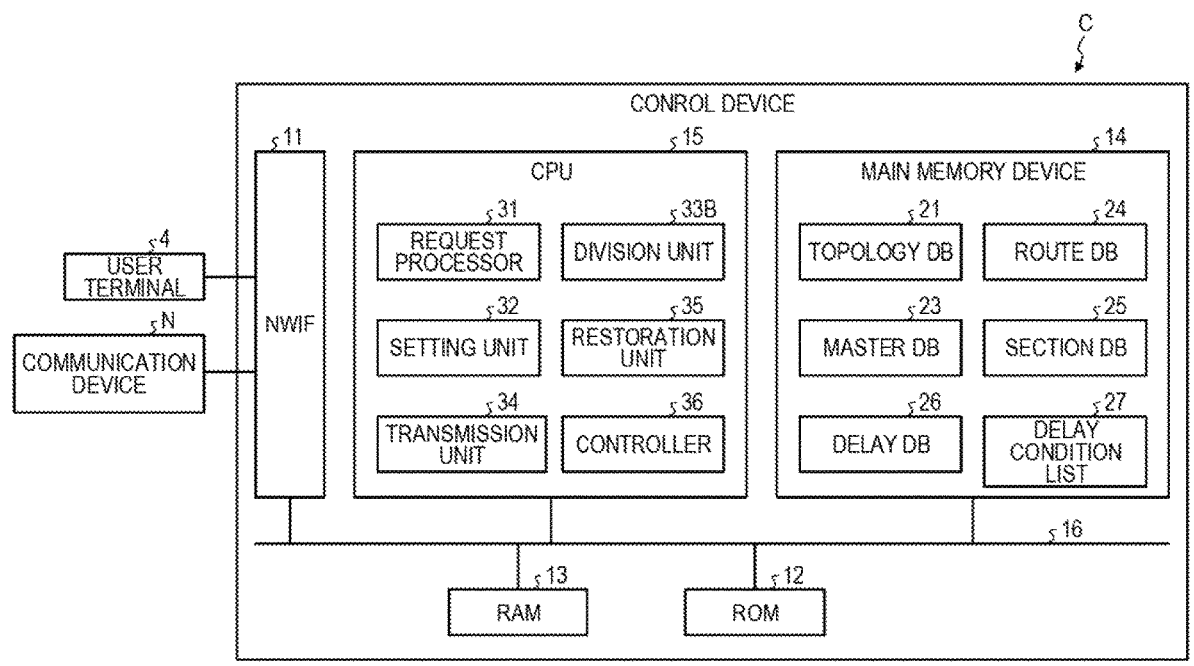
FIG. 21 is a block diagram illustrating an exemplary configuration of a control device of Third Embodiment.

FIG. 21 is a block diagram illustrating an exemplary configuration of a control device C of Third Embodiment. The main memory device 14 within the control device C illustrated in FIG. 21 includes a delay DB 26 and a delay condition list 27, in addition to the topology DB 21, the master DB 23, the route DB 24, and the section DB 25. The delay DB 26 stores delay information. The delay information manages communication delay time for device ID of each communication device N between the communication device N and a control device C thereof. In addition, a control device C is caused to measure communication delay time for each communication device N in advance by using, for example, a Ping command. FIG. 22 is an explanatory view illustrating an example of the delay information. The delay information illustrated in FIG. 22 manages communication delay time 26B, which is associated with device ID 26A of each communication device N, between the communication device N and a control device C thereof. The delay condition list 27 is an area storing a predetermined threshold as a delay condition.

The division unit 33B within the CPU 15 acquires route information. The division unit 33B sequentially designates communication devices N within the route of the route information from the start point, and acquires communication delay time for each of the control devices C corresponding to the device IDs of the designated communication devices N, by referring to the delay information within the delay DB 26. The division unit 33B extracts control devices C each exhibiting communication delay time which is equal to or less than a predetermined threshold. In this case, the predetermined threshold is, for example, 20 ms. The division unit 33B arranges, on the route, the control devices C each exhibiting communication delay time which is equal to or less than the predetermined threshold, and determines communication devices N where the same control device C is continuous, as a section.

Since the control devices C of the communication devices N1, N2, N3, and N4 on the route are the control devices C1 and C2, and the control devices C of the communication devices N5 and N6 on the route are the control devices C3 and C4, the division unit 33B determines the communication devices N1 to N4 as a section SG1, and the communication devices N5 and N6 as a section SG2.

The division unit 33B allows the control devices C1 and C2 within the section SG1 to be control device for failure recovery candidates within the section SG1, and determines a control device C for failure recovery from the control device for failure recovery candidates. Further, the division unit 33B allows the control devices C3 and C4 within the section SG2 to be control device for failure recovery candidates within the section SG2, and determines a control device C for failure recovery from the control device for failure recovery candidates.

The division unit 33B generates section information including section ID 25A, route ID 25B, management ID 25C that identifies a control device C for failure recovery of a section, start point ID 25D and end point ID 25E that identify a start point and an end point of a section, and a route 25F that indicates a route sequence of communication devices N on a section. The division unit 33B stores the generated section information in the section DB 25.

Subsequently, the operation of the communication system 1C of Third Embodiment will be described. The operation of the division unit 33B within the control device C1 will be described.

Figures 23, 24:
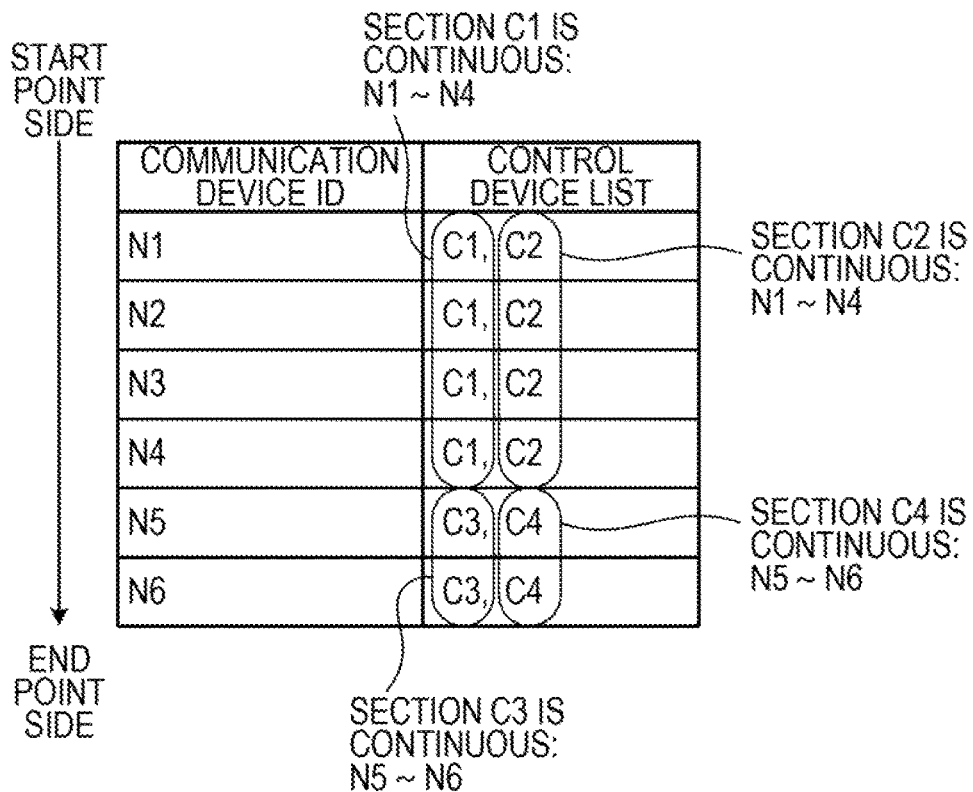
FIG. 23 is an explanatory view illustrating an example of a section specifying operation.
FIG. 24 is an explanatory view illustrating an example of section information.

It is assumed that the division unit 33B has acquired route information including the route of the site T1, the communication devices N1, N2, N3, N4, N5, and N6, and the site T2. By referring to the delay information within the delay DB 26, the division unit 33B specifies a control device C exhibiting communication delay time which is equal to or less than the predetermined threshold, i.e., 20 ms, for each communication device N on the route. As illustrated in FIG. 23, the division unit 33B specifies the control devices C1 and C2 of the communication device N1, the control device C1 and C2 of the communication device N2, the control devices C1 and C2 of the communication device N3, and the control devices C1 and C2 of the communication device N4. Further, the division unit 33B specifies the control devices C3 and C4 of the communication device N5, and the control devices C3 and C4 of the communication device N5.

As illustrated in FIG. 24, the division unit 33B divides the route into a section SG1 of the communication devices N1 to N4 where the control devices C1 and C2 are continuous, and a section SG2 of the communication devices N5 and N6 where the control devices C3 and C4 are continuous. By referring to the section information within the section DB 25, the division unit 33B determines the control device C1 of the control devices C1 and C2 of the section SG1 as a control device C for failure recovery based on the management ID corresponding to the section SG1. Further, by referring to the section information within the section DB 25, the division unit 33B determines the control device C4 of the control devices C3 and C4 of the section SG2 as a control device C for failure recovery based on the management ID corresponding to the section SG2.

Figure 25:
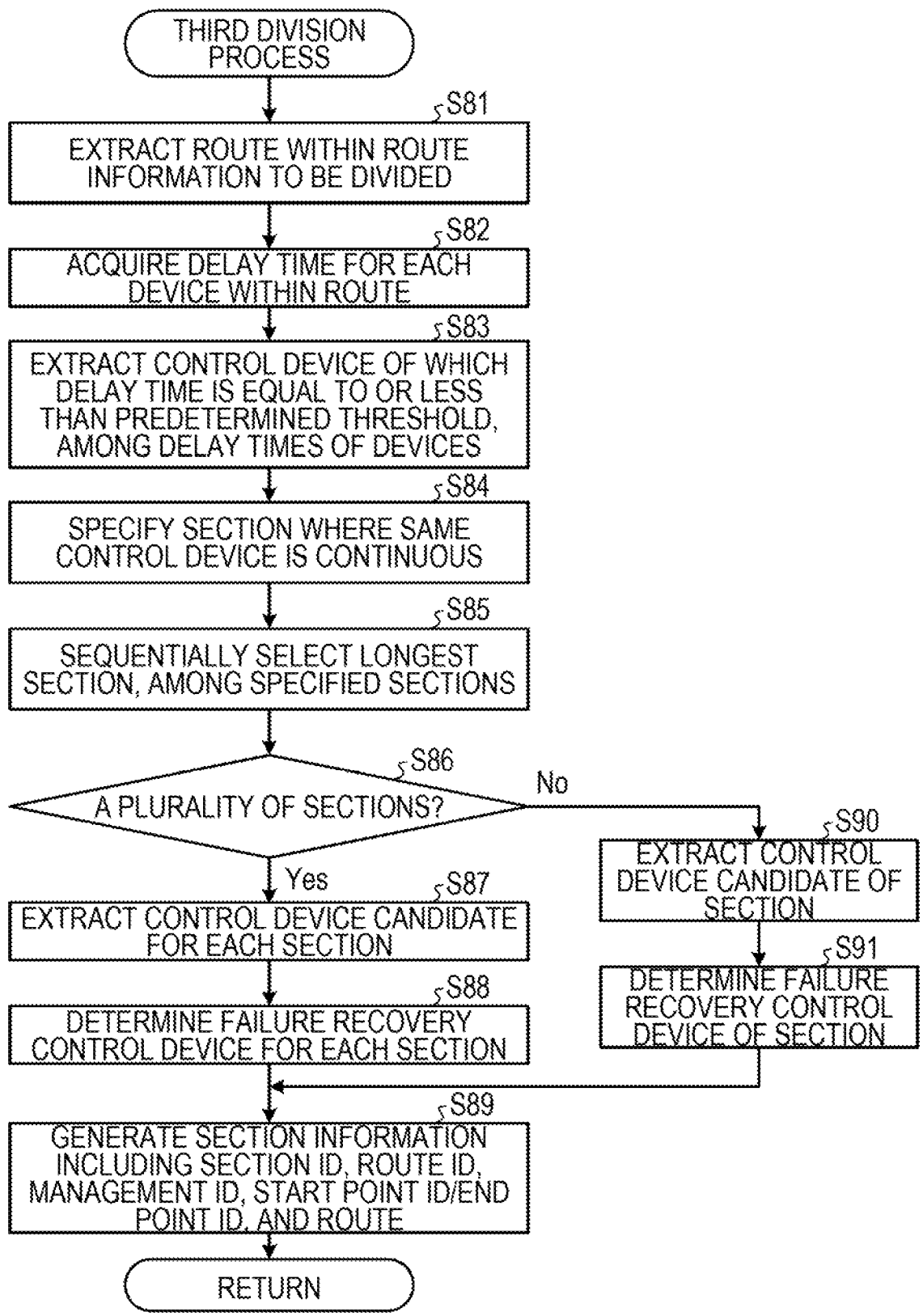
FIG. 25 is a flow chart illustrating an exemplary process operation of a CPU within a control device with regard to a third division process.

FIG. 25 is a flow chart illustrating an exemplary process operation of the CPU 15 within a control device C with regard to a third division process. It is assumed that the third division process illustrated in FIG. 25 is executed as the division process of the operation S15 of FIG. 10. The third division process illustrated in FIG. 25 divides a route into a plurality of sections based on communication delay time between a communication device N and a control device C.

In FIG. 25, the division unit 33B within the CPU 15 of a control device C extracts a route within route information to be divided (operation S81). After extracting the route, the division unit 33B acquires communication delay times of the respective control devices C corresponding to device IDs of the devices from the start point within the route (operation S82), by referring to the delay information within the delay DB 26.

The division unit 33B extracts control devices C each exhibiting communication delay time which is equal to or less than the predetermined threshold, among the communication delay times of the respective control devices C of the devices within the route (operation S83). The division unit 33B specifies sections where the same control device C is continuous, among the control devices C each exhibiting communication delay time which is equal to or less than the predetermined threshold (operation S84).

The division unit 33B sequentially selects the longest section among the specified sections (operation S85), and determines whether a plurality of sequentially selected sections are present (operation S86). Here, the longest section is determined in view of the start point. When it is determined that a plurality of sequentially selected sections are present (Yes of operation S86), the division unit 33B extracts device IDs of control devices C of each section as device IDs of control device candidates (operation S87). The division unit 33B determines device ID of a control device C for failure recovery of each section from the device IDs of the control device for failure recovery candidates in the section (operation S88).

When the device ID of the control device C for failure recovery of each section is determined, the division unit 33B generates section information including section ID 25A, route ID 25B, management ID 25C, start point ID 25D, end point ID 25E, and a route 25E (operation S89). Then, the division unit 33B ends the process of the operation S15 illustrated in FIG. 10.

When it is determined that a plurality of sequentially selected sections are not present ("No" of operation S86), the division unit 33B determines that a single section is present, and thus, extracts the device ID of the control device C of the section as device ID of a control device for failure recovery candidate (operation S90). The division unit 33B determines device ID of a control device C for failure recovery of the section from the device ID of the control device candidate of the section (operation S91), and proceeds to the operation S89 to generate section information.

The division unit 33B executing the third division process illustrated in FIG. 25 acquires control devices C each exhibiting communication delay time which is equal to or less than the predetermined threshold, for each communication device N within the route, and divides the route into a plurality of sections according to sections where the same control device C is continuous, based on the acquisition result. As a result, the division unit 33B may divide the route into a plurality of sections.

The control device C of Third Embodiment divides a route into a plurality of sections based on communication delay time for each communication device N, without requiring area DB 22. As a result, the division unit 33B may divide a route into a plurality of sections.

The control device C of Third Embodiment specifies control devices C where communication delay time between each of the control devices C and each communication device N on a route is equal to or less than the predetermined threshold, and divides the route into sections in the unit of the specified control devices C each exhibiting communication delay time which is equal to or less than the predetermined threshold. In addition, upon detecting a failure on the route, the control device C specifies a section corresponding to the failure site, and transmits failure information to a control device C for failure recovery corresponding to the specified section. As a result, the time required to restore a failure may be reduced.

Here, in the third division process of FIG. 25, the section information is generated even when it is determined in the operation S 86 that a plurality of sections are not present. However, the section information may not be generated.

The controller C of each of First and Second Embodiments is equipped therein with the topology DB 21, the area DB 22, the master DB 23, the route DB 24, and the section DB 25. However, a server collectively managing the topology DB 21, the area DB 22, the master DB 23, the route DB 24, and the section DB 25 may be provided outside the control device C. In this case, each control device C may be caused to access the topology DB 21, the area DB 22, the master DB 23, the route DB 24, and the section DB 25 within the server. In the control device C of Third Embodiment as well, a server collectively managing the topology DB 21, the area DB 22, the master DB 23, the route DB 24, and the section DB 25 may be provided outside the control device C.

In deciding a control device C for failure recovery of each section, the division unit 33 (33A or 33B) of the above-described embodiments determines a control device C controlling the smallest number of communication devices N as a control device C for failure recovery, among control devices C controlling communication device N within the same section. However, a control device C for failure recovery may be randomly and alternately selected from the control devices C within the same section.

In the above-described embodiments, control devices C controlling communication devices N on the WAN 2 are set. However, control devices C may be distributed to control communication devices N based on the load of the control devices C. Further, the WAN 2 is described as an example of a line accommodating communication devices N, but without being limited to the WAN 2, communication lines such as packet lines may be used.

In addition, each component of the respective illustrated units is not necessarily required to be configured physically as illustrated therein. That is, concrete forms of distribution or integration of the individual units are not limited to those illustrated, and all or some of the units may be configured to be functionally or physically distributed or integrated in arbitrary units depending on, for example, various loads or use conditions.

Further, some or all of the various process functions performed in the respective devices may be implemented on a central processing unit (CPU), a digital signal processor (DSP) or a field programmable gate array (FPGA). In addition, some or all of the various process functions may be implemented on a program to perform analysis and execution by a CPU or on hardware by a wired logic.

The areas storing a variety of information may be configured with, for example, a ROM or a RAM such as a synchronous dynamic random access memory (SDRAM), a magneto-resistive random access memory (MRAM), or a nonvolatile random access memory (NVRAM).

Figure 26:
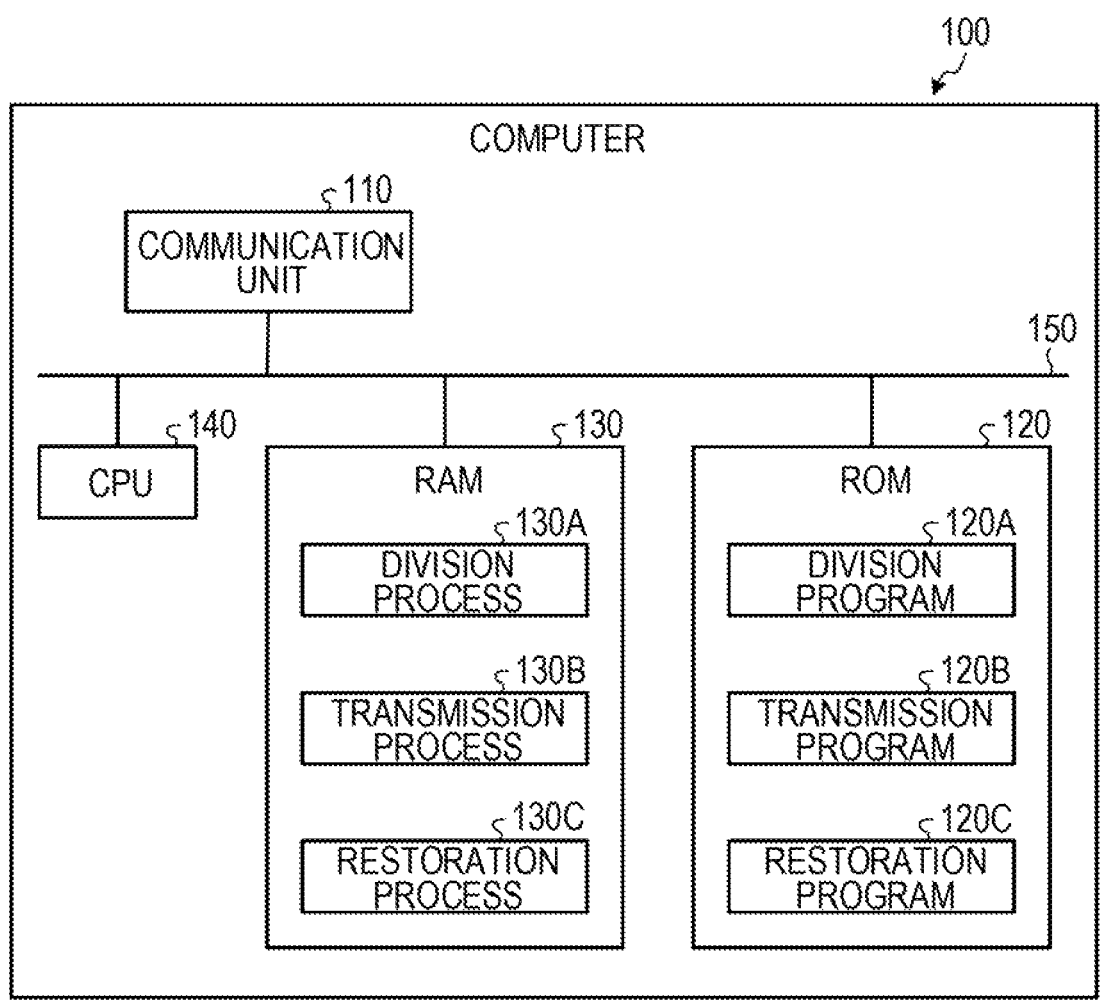
FIG. 26 is an explanatory view illustrating an example of a computer executing a failure restoration program.

However, the various processes described in the embodiments may be implemented by causing a processor (e.g., a CPU) in a computer to execute previously prepared programs. Thus, hereinafter, an example of a computer executing a program having the same function as that of the above-described embodiments will be described. FIG. 26 is an explanatory view illustrating an example of a computer executing a failure restoration program.

As illustrated in FIG. 26, a computer 100 executing a failure restoration program has a communication unit 110, a ROM 120, a RAM 130, and a CPU 140. The communication unit 110, the ROM 120, the RAM 130, and the CPU 140 are connected to each other through a bus 150. The communication unit 110 communicates with each communication device within a communication network.

The ROM 120 stores a failure restoration program exhibiting the same function as that of the above-described embodiments, in advance. The ROM 120 stores a division program 120A, a transmission program 120B, and a restoration program 120C as the failure restoration program. In addition, the failure restoration program may be recorded in a computer readable recording medium as a drive (not illustrated), rather than the ROM 120. The recording medium may be, for example, a portable recording medium such as a CD-ROM, a DVD disk or a USB memory, or a semiconductor memory such as a flash memory.

The CPU 140 reads the division program 120A from the ROM 120, and functions as a division process 130A on the RAM 130. Further, the CPU 140 reads the transmission program 120B from the ROM 120, and functions as a transmission process 130B on the RAM 130. The CPU 140 reads the restoration program 120C from the ROM 120, and functions a restoration process 130C on the RAM 130.

The CPU 140 divides a route establishing a communication using communication devices into sections, and determines a failure recovery computer to restore a failure within each section. When a failure is detected on the route, the CPU 140 specifies the section of the failure site, and transmits failure information to the failure recovery computer which corresponds to the specified section. The CPU 140 sets a detour of the failure site within the section based on the failure information. As a result, the time required to restore a failure may be reduced.

All examples and conditional language recited herein are intended for pedagogical purposes to aid the reader in understanding the disclosure and the concepts contributed by the inventor to furthering the art, and are to be construed as being without limitation to such specifically recited examples and conditions, nor does the organization of such examples in the specification relate to a showing of the superiority and inferiority of the disclosure. Although the embodiment(s) of the present disclosure has (have) been described in detail, it should be understood that the various changes, substitutions, and alterations could be made hereto without departing from the spirit and scope of the disclosure.

What is claimed is:

1. A communication control device on a communication network, the communication control device comprising:
    a memory; and
    a processor coupled with the memory and configured to:
    divide a route for a communication with a communication device into a plurality of sections;
    select a failure recovery communication control device among a plurality of communication control devices that are configured to control a plurality of communication devices, respectively, and set transmission setting information in the plurality of communication devices controlled by the plurality of communication control devices, respectively, in a section of the plurality of sections, the failure recovery communication control device recovering a failure in the section of the plurality of sections;
    specify a failure section of the plurality of sections where the failure occurs when the failure is detected on the route;
    transmit failure information to a specified failure recovery communication control device corresponding to the failure section; and
    set a detour of the failure section, based on the failure information.

2. The communication control device according to claim 1,
    wherein the processor is further configured to
    manage area identification information for identifying an area in which the communication device and the communication control device are arranged; and
    divide the route into the plurality of sections that are grouped by a unit of the area identified by the area identification information.

3. The communication control device according to claim 1,
    wherein the processor is further configured to
    manage device identification information for identifying the communication control device to control the communication device; and
    divide the route into the plurality of sections that are grouped by a unit of the communication control device identified by the device identification information.

4. The communication control device according to claim 3,
    wherein the processor is further configured to
    integrate the section of the plurality of sections and a previous or subsequent section of the section, when a number of communication devices in the section is less than a predetermined number.

5. The communication control device according to claim 1,
    wherein the processor is further configured to
    manage a communication delay time between the communication device and the communication control device;
    specify the communication control device of which the communication delay time is equal to or less than a predetermined time; and
    divide the route into the plurality of sections that are grouped by a unit of the communication control device specified by the communication delay time.

6. The communication control device according to claim 1,
    wherein the processor is further configured to
    select the failure recovery communication control device as a communication control device for controlling a smallest number of communication devices, among the plurality of communication control devices in the section.

7. The communication control device according to claim 1,
    wherein the processor is further configured to
    transmit the failure information to another communication control device for controlling the communication device in the section where the failure occurs, when the detour of the failure section is not set.

8. A communication system comprising:
    a plurality of communication devices; and
    a plurality of communication control devices that are configured to control the plurality of communication devices, respectively, and set transmission setting information in the plurality of communication devices controlled by the plurality of communication control devices, respectively, on a communication network, each of the plurality of communication control devices including:
    a memory; and
    a processor coupled with the memory and configured to:
    divide a route for a communication with a communication device into a plurality of sections;
    select a failure recovery communication control device among the plurality of communication control devices in a section of the plurality of sections, the failure recovery communication control device recovering a failure in the section of the plurality of sections;

specify a failure section of the plurality of sections where the failure occurs when the failure is detected on the route;

transmit failure information to a specified failure recovery communication control device corresponding to the failure section; and set a detour of the failure section, based on the failure information.

9. A failure recovery method for a communication control device on a communication network, the failure recovery method comprising:

dividing a route for a communication with a communication device into a plurality of sections;

selecting a failure recovery communication control device among a plurality of communication control devices that are configured to control a plurality of communication devices, respectively, and set transmission setting information in the plurality of communication devices controlled by the plurality of communication control devices, respectively, in a section of the plurality of sections, the failure recovery communication control device recovering a failure in the section of the plurality of sections;

specifying a failure section of the plurality of sections where the failure occurs when the failure is detected on the route;

transmitting failure information to a specified failure recovery communication control device corresponding to the failure section; and setting a detour of the failure section, based on the failure information, by a processor of the communication control device.

10. The communication control device according to claim 1, wherein the processor is configured to specify a section ID of the failure section by referring to a section information, based on a communication device ID of the communication device as a notification destination within the failure information and transmit the failure information to the specified failure recovery communication control device of a management ID corresponding to the section ID of the failure section.

11. The communication control device according to claim 1, wherein the processor is configured to set the detour of the failure section by a Dijkstra's algorithm, based on the failure information, a section information of the failure section, and a topology information.

* * * * *